(12) United States Patent
Sekimori

(10) Patent No.: US 7,927,215 B2
(45) Date of Patent: Apr. 19, 2011

(54) STORAGE MEDIUM STORING A GAME PROGRAM, GAME APPARATUS AND GAME CONTROLLING METHOD

(75) Inventor: Kazuki Sekimori, Tokyo (JP)

(73) Assignee: Ninetendo Co., Ltd., Kyoto (JP)

( * ) Notice: Subject to any disclaimer, the term of this patent is extended or adjusted under 35 U.S.C. 154(b) by 1102 days.

(21) Appl. No.: 11/598,768

(22) Filed: Nov. 14, 2006

(65) Prior Publication Data

US 2007/0111804 A1    May 17, 2007

(30) Foreign Application Priority Data

Nov. 14, 2005   (JP) ................................. 2005-328605

(51) Int. Cl.
| | |
|---|---|
| *A63F 13/00* | (2006.01) |
| *A63F 9/24* | (2006.01) |
| *A63F 13/06* | (2006.01) |
| *A63F 13/10* | (2006.01) |

(52) U.S. Cl. .................. 463/32; 463/5; 463/30; 463/31; 463/37; 273/108.1; 273/348; 273/461; 348/141; 348/576; 348/719; 345/24; 345/419; 345/636; 345/653; 434/118

(58) Field of Classification Search .................. 463/1–5, 463/7–9, 30–34, 36–39, 40–43, 49–57; 273/108.1, 273/127 R, 148 R, 148 B, 309, 317.1, 340, 273/348, 361–367, 461; 348/14.15, 39, 42, 348/47–52, 115, 117, 121, 135–137, 141, 348/211.14, 576, 588–589, 719, 721, E13.004, 348/E13.064–E13.067; 717/168–178; 345/1.1–1.3, 345/2.1–2.3, 3.1–3.4, 24, 419, 467–469, 473, 539, 543–544, 625, 636, 638, 653–656, 664–666, 682–683, 686, 949–950, FOR. 139, FOR. 153; 434/37–38, 43–44, 69, 118, 240, 256–257; 375/240.15–240.16, 240.25; *A63F 13/00, 13/06, 13/10, 9/24*

See application file for complete search history.

(56) References Cited

U.S. PATENT DOCUMENTS

| | | | | |
|---|---|---|---|---|
| 5,463,722 | A | * 10/1995 | Venolia | .......................... 345/662 |
| 5,610,665 | A | * 3/1997 | Berman | .......................... 348/564 |
| 5,917,495 | A | * 6/1999 | Doi et al. | ...................... 345/419 |

(Continued)

OTHER PUBLICATIONS

"Yoshi's Island DS" Nintendo DS, http://www.nintendo.co.jp/ds/ayij/index.html, 18 pages, Jan. 2005.

*Primary Examiner* — David L Lewis
*Assistant Examiner* — Arthur O. Hall
(74) *Attorney, Agent, or Firm* — Nixon & Vanderhye P.C.

(57) ABSTRACT

A game apparatus includes an LCD, and on the LCD, a touch panel is set. When a player object encounters an enemy object, a battle screen is displayed on the LCD. A player performs a sliding operation on the touch panel with a stick or the like in such a manner as to surround the enemy object and tries to obtain the enemy object. At this time, when the enemy object (affecting object) already obtained is selected, an ability (effect) equipped with the affecting object can be produced. For example, a flame according to a surrounding line is generated. When the flame hits the enemy object, the enemy object is damaged to decrease its moving speed and stop moving.

36 Claims, 19 Drawing Sheets

U.S. PATENT DOCUMENTS

| | | | |
|---|---|---|---|
| 5,999,185 A * | 12/1999 | Kato et al. | 345/420 |
| 6,002,401 A * | 12/1999 | Baker | 715/839 |
| 6,154,197 A * | 11/2000 | Watari et al. | 345/161 |
| 6,196,917 B1 * | 3/2001 | Mathias et al. | 463/2 |
| 6,445,409 B1 * | 9/2002 | Ito et al. | 348/155 |
| 6,468,157 B1 * | 10/2002 | Hinami et al. | 463/32 |
| 6,587,587 B2 * | 7/2003 | Altman et al. | 382/181 |
| 6,606,104 B1 * | 8/2003 | Kondo et al. | 715/764 |
| 6,730,862 B1 * | 5/2004 | Gasparik | 178/18.01 |
| 6,773,177 B2 * | 8/2004 | Denoue et al. | 400/88 |
| 6,821,206 B1 * | 11/2004 | Ishida et al. | 463/43 |
| 7,001,272 B2 * | 2/2006 | Yamashita et al. | 463/7 |
| 7,215,815 B2 * | 5/2007 | Honda | 382/187 |
| 2005/0020363 A1 * | 1/2005 | Kawamoto et al. | 463/32 |
| 2006/0073862 A1 * | 4/2006 | Shinoda et al. | 463/1 |

* cited by examiner

FIG. 3
(A) GAME SCREEN 100
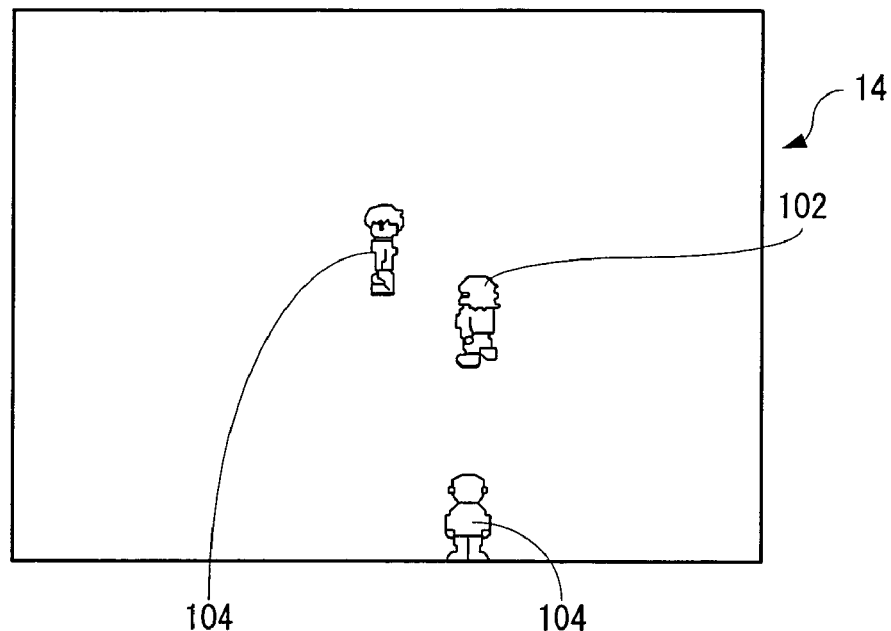
(B) CAPTURE SCREEN 120
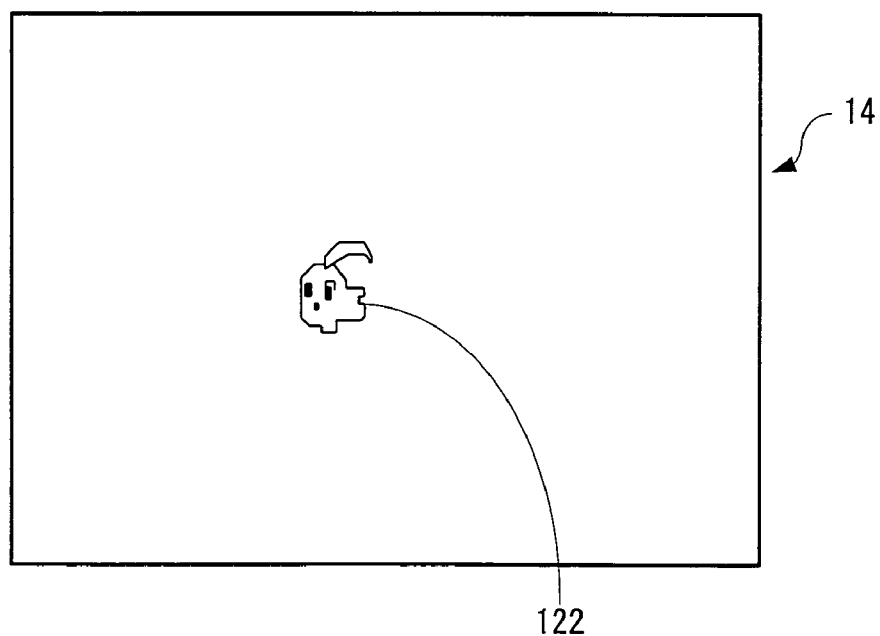

FIG. 4
(A) CAPTURE SCREEN 120
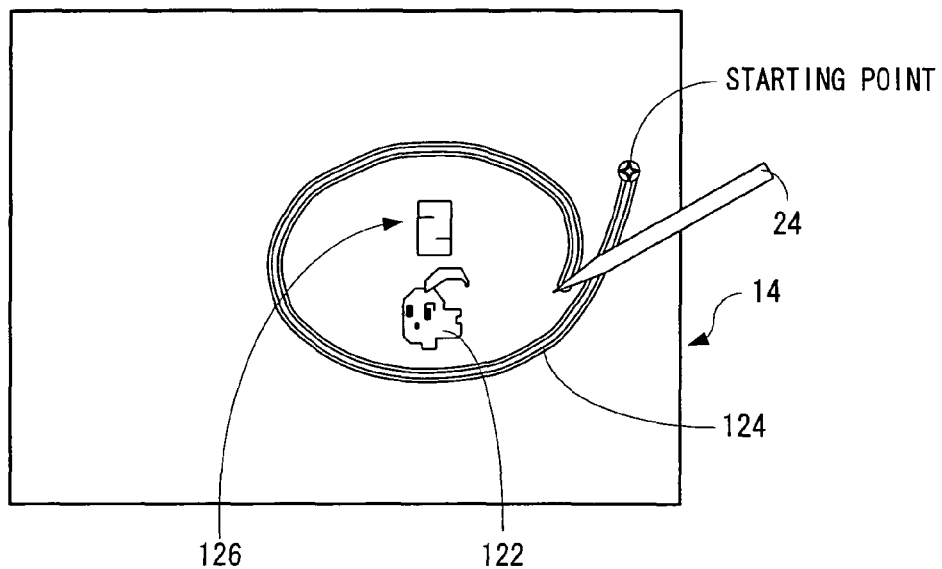
(B) CAPTURE SCREEN 120
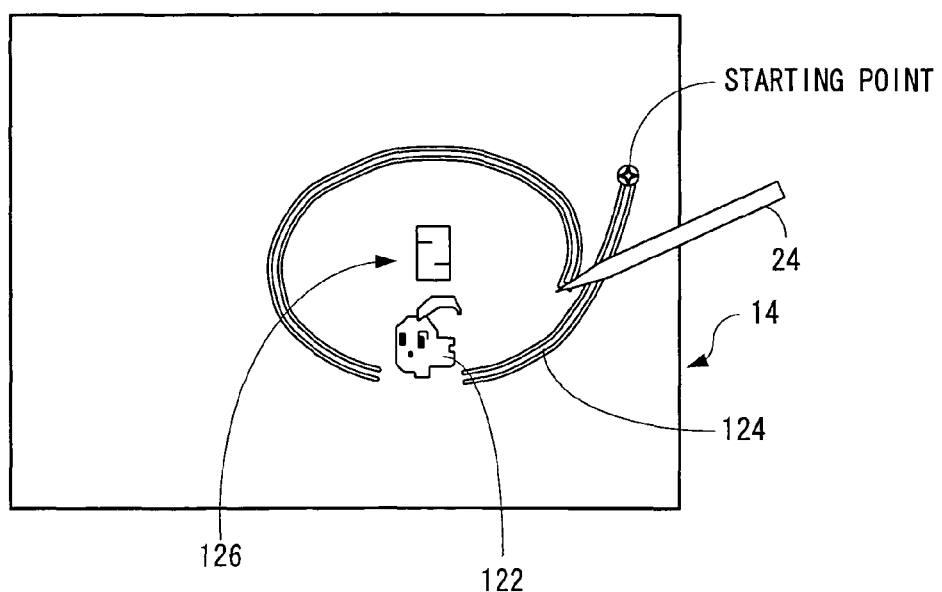

FIG. 6
(A) SURROUNDING LINE
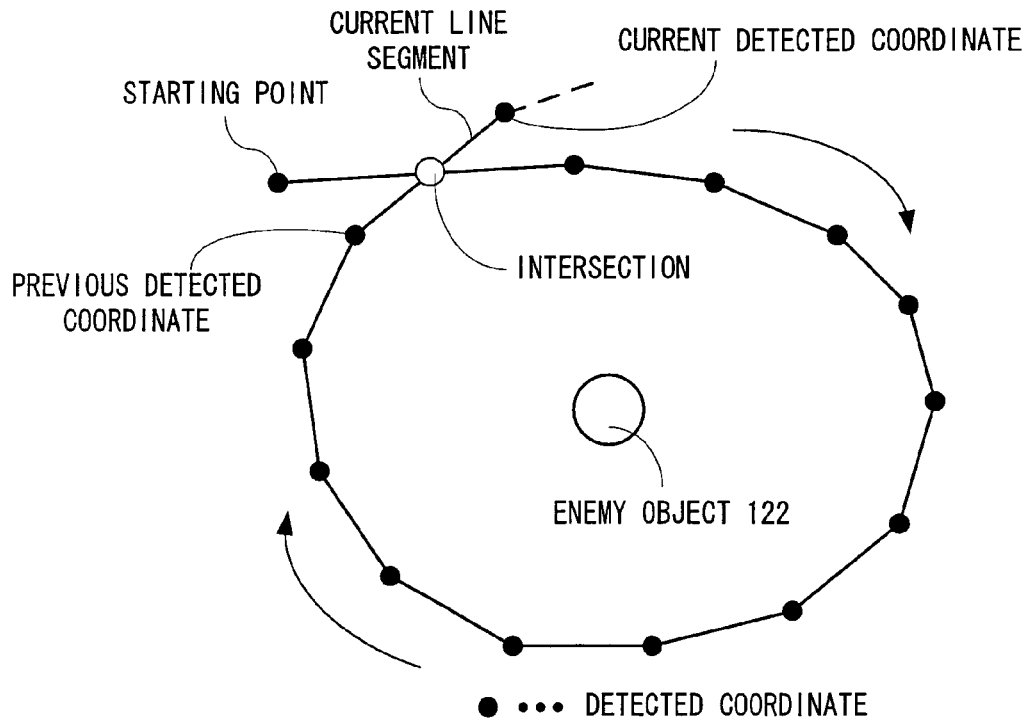
● ··· DETECTED COORDINATE
(B) CLOSED REGION
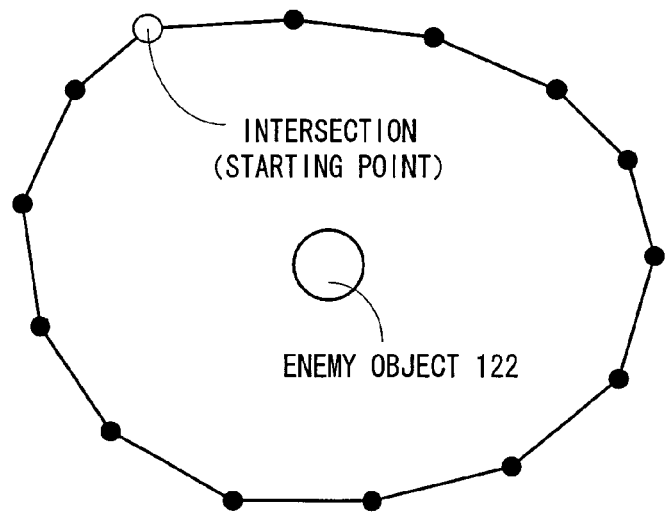

FIG. 7
(A) SURROUNDING DETERMINATION
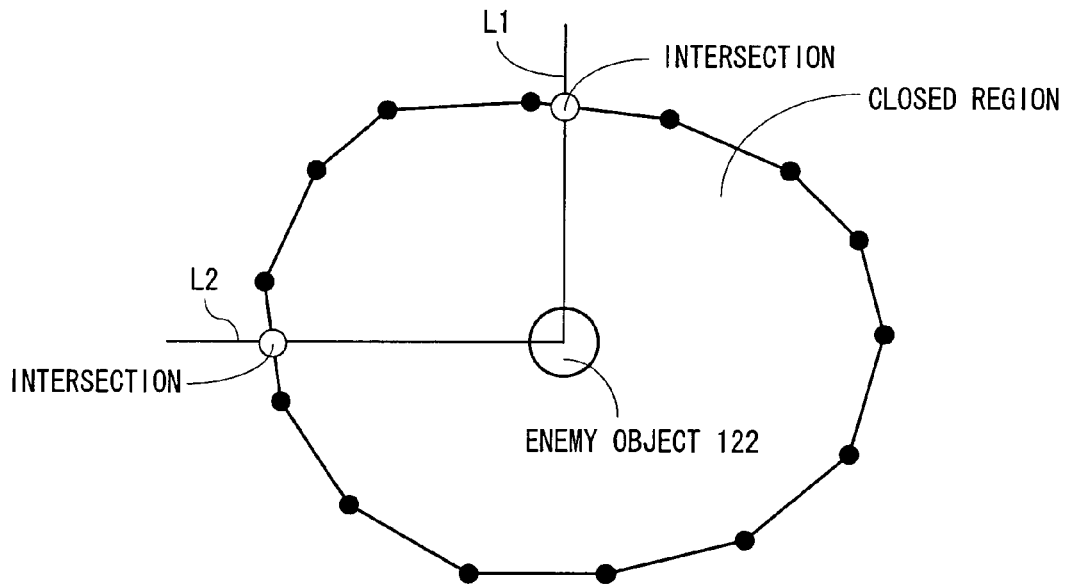
(B) SURROUNDING DETERMINATION
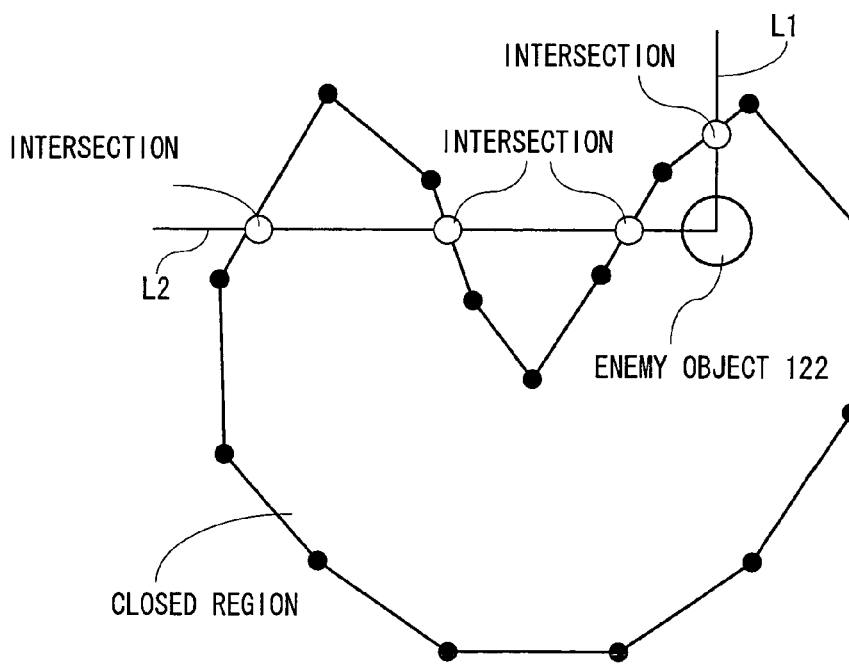

FIG. 10

(A) ENEMY OBJECT DATA  72c

| NAME | ATTRIBUTE | THE NUMBER OF SURROUNDINGS | PLAYER'S ASSISTANCE |
|---|---|---|---|
| ENEMY OBJECT A | WATER | 1 | SLOW DOWN MOVEMENT |
| ENEMY OBJECT B | BATTLE | 1 | DOUBLE THE NUMBER OF SURROUNDINGS |
| ENEMY OBJECT C | ELECTRICITY | 2 | SLOW DOWN MOVEMENT OF ENEMY |
| ENEMY OBJECT D | GRASS | 2 | RESTRICT MOVABLE RANGE OF ENEMY |
| ENEMY OBJECT E | ICE | 2 | STOP MOVEMENT OF ENEMY |
| ENEMY OBJECT F | VICE | 3 | EXTEND LENGTH OF SURROUNDING LINE |
| ⋮ | ⋮ | ⋮ | ⋮ |

(B) DURABILITY DATA  72d

| ENEMY / AFFECTION | WATER | BATTLE | ELECTRICITY | GRASS | ICE | VICE |
|---|---|---|---|---|---|---|
| WATER | 3 | 4 | 1 | 3 | 4 | 1 |
| BATTLE | 2 | 3 | 1 | 3 | 1 | 1 |
| ELECTRICITY | 5 | 5 | 3 | 4 | 5 | 1 |
| GRASS | 3 | 3 | 2 | 3 | 1 | 1 |
| ICE | 2 | 5 | 1 | 5 | 3 | 1 |
| VICE | 5 | 5 | 5 | 5 | 5 | 3 |

FIG. 18

ENEMY OBJECT DATA 72c

| NAME | ATTRIBUTE | SURROUNDING COUNT PROBATILITY (%) | | | PLAYER'S ASSISTANCE |
|---|---|---|---|---|---|
| ENEMY OBJECT A | WATER | 1 | | | SLOW DOWN MOVEMENT |
| | | 100 | | | |
| ENEMY OBJECT B | BATTLE | 1 | | | DOUBLE THE NUMBER OF SURROUNDINGS |
| | | 100 | | | |
| ENEMY OBJECT C | ELECTRICITY | 1 | 2 | | SLOW DOWN MOVEMENT OF ENEMY |
| | | 30 | 100 | | |
| ENEMY OBJECT D | GRASS | 1 | 2 | | RESTRICT MOVABLE RANGE OF ENEMY |
| | | 50 | 100 | | |
| ENEMY OBJECT E | ICE | 1 | 2 | | STOP MOVEMENT OF ENEMY |
| | | 10 | 100 | | |
| ENEMY OBJECT F | VICE | 1 | 2 | 3 | EXTEND LENGTH OF SURROUNDING LINE |
| | | 10 | 50 | 100 | |
| ⋮ | ⋮ | ⋮ | | | ⋮ |

STORAGE MEDIUM STORING A GAME PROGRAM, GAME APPARATUS AND GAME CONTROLLING METHOD

CROSS REFERENCE OF RELATED APPLICATION

The disclosure of Japanese Patent Application No. 2005-328605 is incorporated herein by reference.

BACKGROUND

1. Field

Example embodiments of the present invention relate to a storage medium storing a game program, a game apparatus, and a game controlling method. More specifically, example embodiments of the present invention relate to a storage medium storing a game program, a game apparatus, and a game controlling method for a game apparatus having a display to display an object in a virtual space on a screen and a pointing device for designating at least a position on the screen.

2. Description of the Related Art

Such a kind of a game of the related art is introduced in the Web page of the present application (http://www.nintendo.co.jp/ds/ayij/index.html). In the game, when a circle is drawn on a touch panel so as to surround an item, such as an enemy object and a coin, a plurality of cloud objects are displayed according to the circle, and if an precise circle is drawn, the plurality of cloud objects are changed into a balloon object. At this time, within the balloon object, an enemy object is tuned into a coin (coin is not changed), and when the player object touches the balloon object, he or she can acquire the coin.

However, in the related art, by performing a surrounding operation of the enemy object and the item, an item such as a coin is trapped in the balloon object to thereby allow easy acquisition of the item, but this does not affect the succeeding acquisition of the item and development of the game. Thus, the player does not have to take the kind of the surrounding enemy object and the surrounding item into consideration, resulting in a loss of an interest of the game.

SUMMARY

Therefore, it is a primary object of the present invention to provide a novel storage medium storing a game program, game apparatus, and game controlling method.

Another aspect of example embodiments of the present invention is to provide a storage medium storing a game program, a game apparatus, and a game controlling method capable of increasing an interest of a game.

Example embodiments of the present invention adopt the following construction in order to solve the above-described problems. It should be noted that reference numerals and footnote, etc. which are surrounded in parentheses show only one example of correspondences with the embodiment described later in order to help the understandings of example embodiments of the present invention, and do not limit the present invention.

A storage medium storing a game program according to example embodiments of the present invention stores a game program of a game apparatus having a display for displaying an object in a virtual space on a screen and a pointing device for designating at least a position on the screen. The game program causes a processor of the game apparatus to function as an input coordinate detecting means, a line segment calculating means, a closed region determining means, a surrounding determining means, an affecting object storage controlling means, and a difficulty level changing means. The input coordinate detecting means detects an input coordinate indicating the position on the screen designated by the pointing device every predetermined time period. The line segment calculating means calculates a line segment connecting a previous input coordinate and a current input coordinate which were detected by the input coordinate detecting means. The closed region determining means determines whether or not a closed region is formed by a plurality of line segments calculated by the line segment calculating means. The surrounding determining means determines whether or not the object is included in the closed region when it is determined that the closed region is formed by the closed region determining means. The affecting object storage controlling means stores obtained information taking the object as an affecting object in a storing means when it is determined that the object is included in the closed region by the surrounding determining means. The difficulty level changing means changes a difficulty level of surrounding another object on the basis of the affecting object indicated by the obtained information stored in the storing means.

More specifically, a game apparatus (10) has a display (14) for displaying an object (102, 104, 122) in a virtual space on a screen and a pointing device (22) for designating at least a position on the screen. The game program causes a processor (42) of the game apparatus (10) to function as an input coordinate detecting means (42, S71, S73), a line segment calculating means (42, S85), a closed region determining means (42, S113), a surrounding determining means (42, S121), an affecting object storage controlling means (42, S35, S37) and a difficulty level changing means (42, S19, S169). The input coordinate detecting means (42, S71, S73) detects an input coordinate indicating the position on the screen designated by the pointing device (22) every predetermined time period. The line segment calculating means (42, S85) calculates a line segment connecting a previous input coordinate and a current input coordinate which were detected by the input coordinate detecting means (42, S71, S73). The line segment connects continuous two points. The closed region determining means (42, S113) determines whether or not a closed region is formed by a plurality of line segments calculated by the line segment calculating means (42, S85). For example, it is determined whether or not a currently calculated line segment is cross with a previously calculated line segment. The surrounding determining means (42, S121), when it is determined that a closed region is formed by the closed region determining means, that is, when it is determined that a closed polygon is formed by a plurality of line segments, determines whether or not the object (122 in the embodiment) is included in the closed region (closed polygon). The affecting object storage controlling means (42, S35, S37) stores obtained information (72e) taking the object (122) as an affecting object in a storing means (48) when it is determined that the object (122) is included in the closed region ("YES" in step 121). The difficulty level changing means (42, S19, S169) changes a difficulty level of surrounding another object (122) on the basis of the affecting object indicated by the obtained information stored in the storing means (48).

According to example embodiments of the present invention, since a difficulty level of surrounding another object is changed on the basis of the already obtained object, it is possible to prevent the game being monotonous like a game of merely collecting objects. Furthermore, because the enemy object to be captured has to be taken into consideration, it is possible to increase an interest of the game.

In one aspect of example embodiments of the present invention, a game program causes a processor to further function as a surrounding count counting means for counting the number of determinations that the object is included in the closed region by the surrounding determining means, and a surrounding count determining means for determining whether or not the number of times counted by the surrounding count counting means reaches a predetermined number of times, and the affecting object storage controlling means stores obtained information taking the object as an affecting object in the storing means when it is determined that the number of surroundings reaches the predetermined number of times by the surrounding count determining means. More specifically, the game program causes a processor (42) to further function as a surrounding count counting means (42, S123) and a surrounding count determining means (42, S125). The surrounding count counting means (42, S123) counts the number of determinations that the object (122) is included in the closed region. The surrounding count determining means (42, S125) determines whether or not the number of times counted by the surrounding count counting means (42, S123) reaches a predetermined number of times. For example, the predetermined number of times may be set to different values for each object. The affecting object storage controlling means (42, S35, S37) stores obtained information (72e) taking the object as an affecting object in the storing means (48) when it is determined that the number of surroundings reaches the predetermined number of times ("YES" in S125). Accordingly, by setting the predetermined number of times to different values for each object, it is possible to change the difficulty level for obtaining for each object. Also, a predetermined number of times is set to a relatively large value with respect to an rare object and an object significantly changing the difficulty level for surrounding, thus capable of enhancing difficulty and an interest of the game.

In one example embodiment of the present invention, a game program causes a processor to further function as a surrounding count resetting means for resetting the number of surroundings counted by the surrounding count counting means when an input coordinate is not detected by the input coordinate detecting means, or when the object contacts the line segment. More specifically, the game program causes a processor (42) to further function as a surrounding count resetting means (42, S81, S161). The surrounding count resetting means (42, S81, S161) resets the number of surroundings counted by the surrounding count counting means (42, S123) when an input coordinate is not detected by the input coordinate detecting means (42, S71, S73) ("NO" in S71), or when the object (122) contacts the line segment ("YES" in S151). Accordingly, before the number of surrounding operations reaches the predetermined number of times if the surrounding operation is stopped, or if the object (22) contacts, hits, or attacks the line segment, the number of surroundings is reset. Thus, if the surrounding operation is not continuous or is obstructed due to the hit by the object, the number of surroundings which has already been counted at that time is reset, capable of enhancing the difficulty level for obtaining an object.

In another aspect of example embodiments of the present invention, the difficulty level changing means changes the difficulty level of surrounding for only a fixed period of time, or by the fixed number of times, and the game program causes a processor to function as an erasing means for erasing the obtained information as to the affecting object from the storing means when the fixed period of time elapses, or when the fixed number of times is exceeded. For example, the difficulty level changing means (42, S19, S169) changes the difficulty level of surrounding for only a fixed period of time, or by the fixed number of times. The erasing means (42, S107) erases the obtained information (72e) as to the affecting object from the storing means (48) when the fixed period of time elapses ("YES" in S107), or when the fixed number of times is exceeded. Thus, the difficulty level is changed only for the fixed period of time or by the fixed number of times, and has a limitation thus, preventing the game from being excessively simple or excessively difficult. Accordingly, it is possible to prevent the player from being bored with the game.

In another example embodiment of the present invention, the difficulty level changing means changes a moving speed of the object. More specifically, the difficulty level changing means (42, S19, S169) changes the moving speed of the object (122). For example, the moving speed of the object (122) is increased and decreased. Therefore, by changing the moving speed of the object, the difficulty level of the surrounding operation can be changed, thus capable of enhancing an interest of the game.

In another example embodiment of the present invention, the difficulty level changing means changes the movable range of the object. More specifically, the difficulty level changing means (42, S19, S169) changes a movable range of the object (122). For example, the movable range of the object (122) is widened or narrowed. Thus, the difficulty level of the surrounding operation can be changed, thus capable of enhancing an interest of the game.

In a further example embodiment of the present invention, the difficulty level changing means changes a count value of the surrounding count counting means. More specifically, the difficulty level changing means (42, S19, S169) changes a count value of the surrounding count counting means (42, S123). For example, the count value is increased (doubled), or decreased (halved). Therefore, with a few surrounding counts, the predetermined number of times can be reached, or with the surrounding count more than the actual predetermined number of times, the predetermined number of times can be reached. Thus, the difficulty level of the surrounding operation can be changed, capable of increasing an interest of the game.

In another example embodiment of the present invention, the length of the drawable line is constant, and the difficulty level changing means changes the length of the drawable line. For example, the length of the drawable line (124) by the surrounding operation is constant. The difficulty level changing means (42, S19, S169) changes the length of the drawable line (124). That is, a long drawable line (124) allows surrounding of a relatively large range, making a surrounding operation easy. On the contrary thereto, a short drawable line (124) merely surrounds a relatively narrow range, making the surrounding operation difficult. Thus, the difficulty level of the surrounding operation can be changed, capable of enhancing an interest of the game.

In another aspect of example embodiments of the present invention, a game program causes the processor to function as a line segment displaying means for displaying the line segment calculated by the line segment calculating means in a color based on an attribute of the affecting object corresponding to the obtained information stored in the storing means. More specifically, the game program causes a processor (42) to further function as a line segment displaying means (42, S89). The line segment displaying means (42, S89) displays the line segment calculated by the line segment calculating means (42, S85) in a color based on an attribute of the affecting object corresponding to the obtained information (72e)

stored in the storing means (48). Therefore, it is possible to make the attribute of the selected affecting object visually identifiable.

A game apparatus according to example embodiments of the present invention has a display for displaying an object in a virtual space on a screen and a pointing device for designating at least a position on the screen. The game apparatus comprises an input coordinate detecting means, a line segment calculating means, a closed region determining means, a surrounding determining means, an affecting object storage controlling means, and a difficulty level changing means. The input coordinate detecting means detects an input coordinate indicating the position on the screen designated by the pointing device every predetermined time period. The line segment calculating means calculates a line segment connecting a previous input coordinate and a current input coordinate which were detected by the input coordinate detecting means. The closed region determining means determines whether or not a closed region is formed by a plurality of line segments calculated by the line segment calculating means. The surrounding determining means determines whether or not the object is included in the closed region when it is determined that the closed region is formed by the closed region determining means. The affecting object storage controlling means stores obtained information taking the object as an affecting object in a storing means when it is determined that the object is included in the closed region by the surrounding determining means. The difficulty level changing means changes a difficulty level of surrounding another object on the basis of the affecting object indicated by the obtained information stored in the storing means.

In example embodiments of this invention also, similarly to the above-described example embodiments of the invention corresponding to the storage medium, it is possible to enhance an interest of the game.

A game controlling method according to example embodiments of the present invention is a game controlling method of the game apparatus having a display for displaying an object in a virtual space on a screen and a pointing device for designating at least a position on the screen, and includes following steps of: (a) detecting an input coordinate indicating the position on the screen designated by the pointing device every predetermined time period, (b) calculating a line segment connecting a previous input coordinate and a current input coordinate which were detected by the step (a), (c) determining whether or not a closed region is formed by a plurality of line segments calculated by the step (b), (d) determining whether or not the object is included in the closed region when it is determined that the closed region is formed by the step (c), (e) storing obtained information taking the object as an affecting object in a storing means when it is determined that the object is included in the closed region by the step (d), and (f) changing a difficulty level of surrounding another object on the basis of the affecting object indicated by the obtained information stored in the storing means.

In example embodiments of this invention also, similarly to example embodiments of the above-described invention corresponding to the storage medium, it is possible to enhance an interest of the game.

The above described features, aspects and advantages of example embodiments of the present invention will become more apparent from the following detailed description of example embodiments of the present invention when taken in conjunction with the accompanying drawings.

BRIEF DESCRIPTION OF THE DRAWINGS

FIG. 3 is an illustrative view showing one example of a game screen to be displayed on a second LCD in FIG. 1 embodiment;

FIG. 4 is an illustrative view showing another example of a game screen to be displayed on the second LCD in FIG. 1 embodiment;

FIG. 6 is an illustrative view illustrating a surrounding determination whether or not an enemy object exists within the closed region formed by a surrounding operation;

FIG. 7 is an another illustrative view illustrating a surrounding determination whether or not an enemy object exists within the closed region formed by an surrounding operation;

FIG. 10 is an illustrative view showing a concrete example of enemy object data and durability data shown in FIG. 9;

FIG. 18 is an illustrative view showing a concrete example of enemy object data in a second example embodiment of the present invention.

DETAILED DESCRIPTION OF THE NON-LIMITING EXAMPLE EMBODIMENTS

First Embodiment

Figure 1:
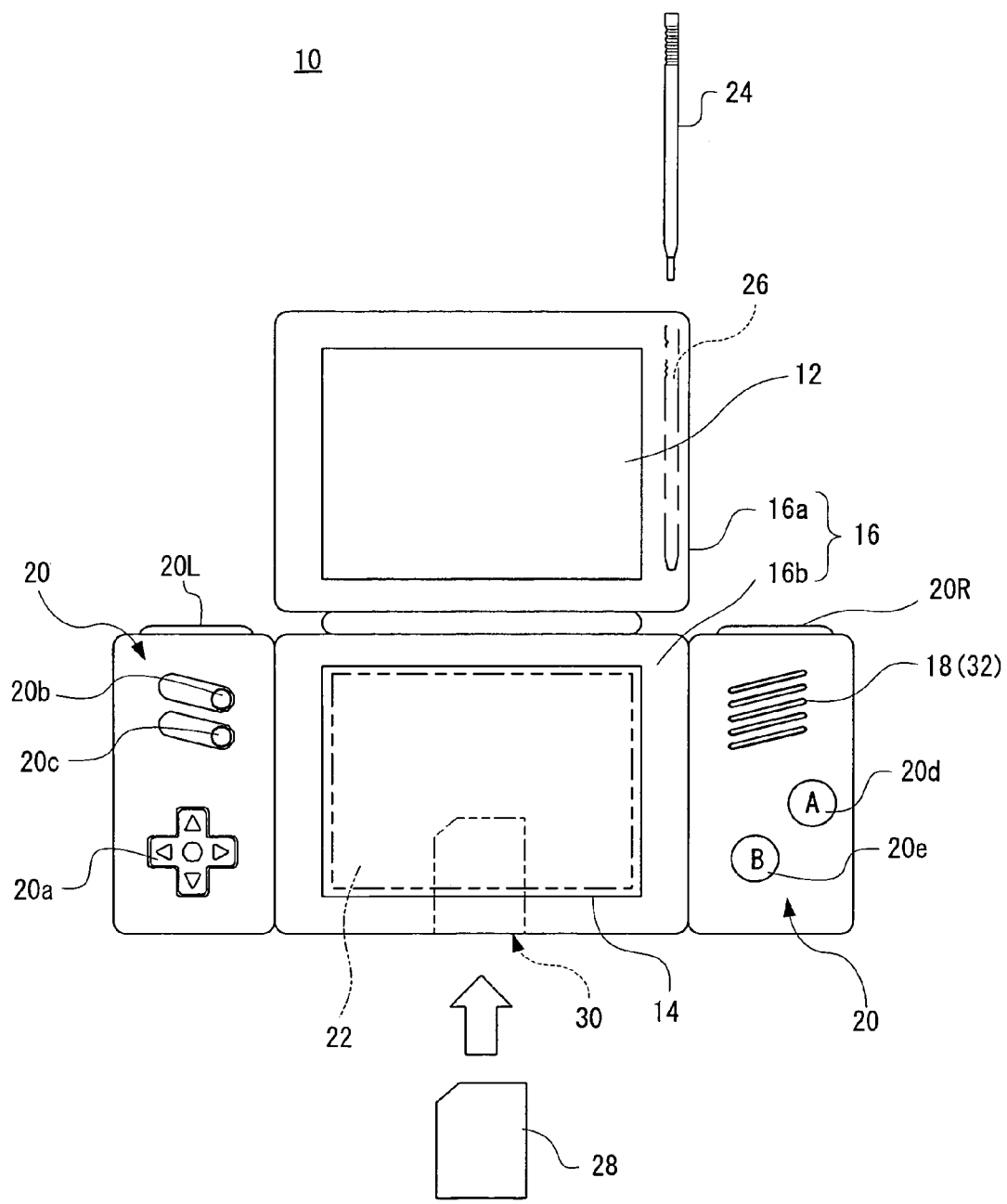
FIG. 1 is an illustrative view showing a game apparatus of example embodiments of the present invention.

Referring to FIG. 1, a game apparatus 10 as one example embodiment of the present invention includes a first liquid crystal display (LCD) 12 and a second LCD 14. The LCD 12 and the LCD 14 are provided on a housing 16 so as to be arranged in a predetermined position in the housing. In this embodiment, the housing 16 comprises an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

It should be noted that although the LCD is utilized as a display in this embodiment, an EL (Electronic Luminescence) display and a plasma display may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. Then, on the lower housing 16b, a sound emission hole 18 is formed, and operating switches 20 (20a, 20b, 20c, 20d, 20e, 20L and 20R) are provided.

In addition, the upper housing 16a and the lower housing 16b are rotatably connected at a lower side (lower edge) of the upper-housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It should be noted that the upper housing 16a and the lower housing 16b are not necessarily rotatably connected with each other, and may alternatively be provided integrally (fixedly) to form the housing 16.

The operating switch 20 includes a direction instructing switch (cross switch) 20a, a start switch 20b, a select switch 20c, an action switch (A button) 20d, an action switch (B button) 20e, an action switch (L button) 22L, and an action switch (R button) 22R. The switches 20a, 20b, and 20c are arranged at the left of the LCD 14 on one surface of the lower housing 16b. The switches 20d and 20e are arranged at the right of the LCD 14 on the one surface of the lower housing 16b. In addition, the switch 20L and the switch 20R are arranged at the right and left corners sandwiching the connected portion with the upper housing 16a on a part of the upper side surface (top surface) of the lower housing 16b.

The direction instructing switch 20a functions as a digital joystick, and is utilized for instructing a moving direction of a player character (or player object) to be operated by a game player and instructing a moving direction of a cursor, and so forth by operating any one of four depression portions. Also, the start switch 20b is formed by a push button, and is utilized for starting (restarting), temporarily stopping (pausing) a game, and so forth. The select switch 20c is formed by the push button, and utilized for a game mode selection, etc.

The action switch 20d, that is, the A button is formed by the push button, and allows the player character to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 20e, that is, the B button is formed by the push button, and is utilized for changing a game mode selected by the select switch 20c, canceling an action determined by the A button 20d, and so forth.

The action switch (left depression button) 20L and the action switch (right depression button) 20R are formed by the push button, and the left depression button (L button) 20L and the right depression button (R button) 20R can perform the same operation as the A button 20d and the B button 20e, and also function as a subsidiary of the A button 20d and the B button 20e.

Also, on a top surface of the LCD 14, a touch panel 22 is provided. As the touch panel 22, any one of a resistance film system, an optical system (infrared rays system) and an electrostatic capacitive coupling system, for example, can be utilized. In response to an operation by depressing, stroking, touching, and so forth with a stick 24, a pen (stylus pen), or a finger (hereinafter, referred to as "stick or the like 24") on a top surface (detection surface) of the touch panel 22, the touch panel 22 detects a coordinate (touch coordinate) of an operated position (touch position) by the stick or the like 24 to output coordinate data corresponding to the detected coordinate.

In this embodiment, a resolution of the display surface of the LCD 14 (the same is true for the LCD 12) is 256 dots×192 dots, and a detection accuracy of the detection surface of the touch panel 22 is also rendered 256 dots×192 dots in correspondence to the resolution of the display surface. However, the detection accuracy of the detection surface of the touch panel 22 may be lower than the resolution of the display surface of the LCD 14, or higher than it.

Different game images (game screens) can be displayed on the LCD 12 and the LCD 14. For example, on one of the LCD (LCD 12, for example), a game screen for playing the game is displayed, and on the other LCD (LCD 14, for example), a game screen (operation screen) for inputting a predetermined image (text) for operating the game, and instructing icons can be displayed. Accordingly, the game player can input the textual (command) or instruct the icons (or predetermined images) on the screen of the LCD 14 by operating the touch panel 22 with the stick or the like 24.

Thus, the game apparatus 10 has the LCD 12 and the LCD 14 as a display portion of two screens, and by providing the touch panel 22 on an upper surface of any one of them (LCD 14 in the first embodiment), the game apparatus 10 has the two screens (12, 14) and the operating portions (20, 22) of two systems.

Also, in this embodiment, the stick 24 can be housed in the housing portion (housing slot) 26 provided in the proximity to the side surface (right side surface) of the upper housing 16a, for example, and taken out as necessary. However, if the stick 24 is not provided, the housing portion 26 also needs not to be provided.

Furthermore, the game apparatus 10 includes a memory card (or game cartridge) 28. The memory card 28 is detachable, and inserted into a loading slot 30 provided on a rear surface or a lower edge (bottom surface) of the lower housing 16b. Although omitted in FIG. 1, a connector 46 (see FIG. 2) is provided at a depth portion of the loading slot 30 for connecting a connector (not shown) provided at an end portion of the memory card 28 in the loading direction, and when the memory card 28 is loaded into the loading slot 30, the connectors are connected with each other to allow a CPU core 42 (see FIG. 2) of the game apparatus 10 to become accessible to the memory card 28.

Although not illustrated in FIG. 1, the speaker 32 (see FIG. 2) is provided at a position corresponding to the sound emission hole 18 inside the lower housing 16b.

Furthermore although omitted in FIG. 1, a battery accommodating box is provided on a rear surface of the lower housing 16b, for example, and a power switch, a volume switch, an external expansion connector, an earphone jack, etc. are provided on a bottom surface of the lower housing 16b.

Figure 2:
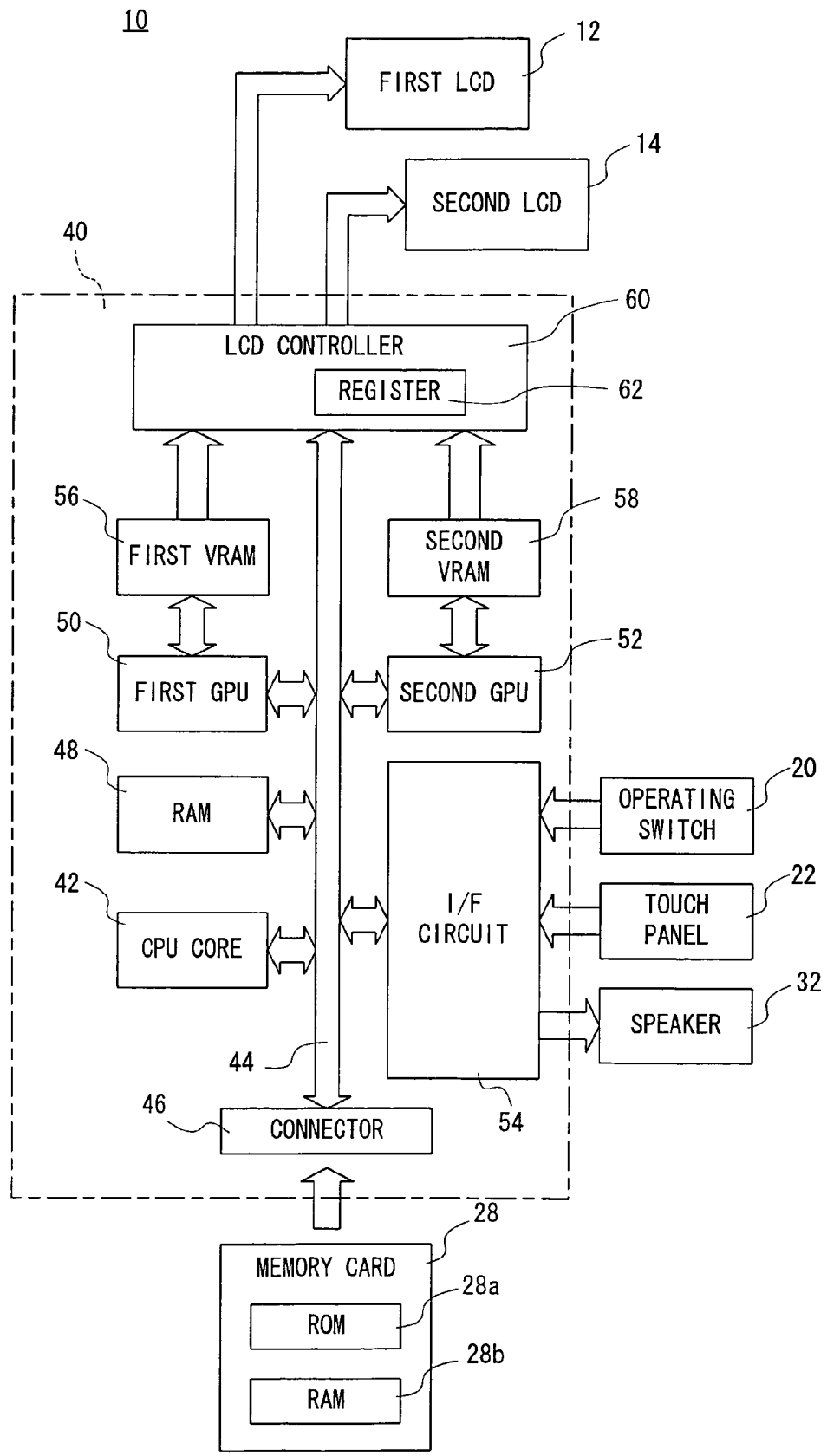
FIG. 2 is a block diagram of an electric configuration of the game apparatus shown in FIG. 1 embodiment.

FIG. 2 is a block diagram showing an electrical configuration of the game apparatus 10. Referring to FIG. 2, the game apparatus 10 includes an electronic circuit board 40, and on the electronic circuit board 40, a circuit component such as a CPU core 42, etc. is mounted. The CPU core 42 is connected to the above-described connector 46 via a bus 44, and is connected with a RAM 48, a first graphics processing unit (GPU) 50, a second GPU 52, an input-output interface circuit (hereinafter, referred to as "I/F circuit") 54, and an LCD controller 60.

The connector 46 is detachably connected with the memory card 28 as described above. The memory card 28 includes a ROM 28a and a RAM 28b, and although illustration is omitted, the ROM 28a and the RAM 28b are connected with each other via a bus and also connected with a connector (not shown) to be connected with the connector 46. Accordingly, the CPU core 42 can access the ROM 28a and the RAM 28b as described above.

The ROM 28a stores in advance a game program for a game (virtual game) to be executed by the game apparatus 10, image data (character image, background image, item image, icon (button) image, message image, etc.), data of the sound (music) necessary for the game (sound data), etc. The RAM (backup RAM) 28b stores (saves) proceeding data of the game, result data of the game.

The RAM 48 is utilized as a buffer memory or a working memory. That is, the CPU core 42 loads the game program, the image data, the sound data, etc. stored in the ROM 28a of the memory card 28 into the RAM 48, and executes the loaded game program. Furthermore, the CPU core 42 executes a game process while storing data (game data, flag data) temporarily generated in correspondence with a progress of the game in the RAM 48.

Additionally, the game program, the image data, the sound data, etc. are stored (loaded) from the ROM 28a entirely at a time, or partially and sequentially so as to be stored into the RAM 48.

Each of the GPU 50 and the GPU 52 forms a part of a rendering means, is constructed by, for example, a single chip ASIC, and receives a graphics command from the CPU core 42 to generate game image data according to the graphics command. It should be noted that the CPU core 42 applies an image generation program (included in the game program) required to generate the game image data to both of the CPU 50 and GPU 52 in addition to the graphics command.

Furthermore, the GPU 50 is connected with a first video RAM (hereinafter referred to as "VRAM") 56, and the GPU 52 is connected with a second VRAM 58. The GPU 50 and the GPU 52 respectively access the first VRAM 56 and the second VRAM 58 to obtain necessary data (image data: character data, texture data, etc.) necessary for executing the graphics command. Also, the CPU core 42 writes image data necessary for rendering to the first VRAM 56 and the second VRAM 58 via the GPU 50 and the GPU 52. The GPU 50 accesses the VRAM 56 to create game image data for rendering, and the GPU 52 accesses the VRAM 58 to create game image data for rendering.

The VRAM 56 and the VRAM 58 are connected to the LCD controller 60. The LCD controller 60 includes a register 62, and the register 62 consists of, for example, one bit, and stores a value of "0" or "1" (data value) according to an instruction from the CPU core 42. The LCD controller 60 outputs the game image data created by the GPU 50 to the LCD 12, and outputs the game image data created by the GPU 52 to the LCD 14 in a case that the data value of the register 62 is "0". Also, the LCD controller 60 outputs the game image data created by the GPU 50 to the LCD 14, and outputs the game image data created by the GPU 52 to the LCD 12 in a case that the data value of the register 62 is "1".

Additionally, the LCD controller 60 directly reads the game image data from the VRAM 56 and the VRAM 58, or reads the image data from the VRAM 56 and the VRAM 58 via the GPU 50 and the GPU 52.

The I/F circuit 54 is connected with the operating switch 20, the touch panel 22, and the speakers 32. Here, the operating switch 20 is the above-described switches 20a, 20b, 20c, 20d, 20e, 20L and 20R, and in response to an operation of the operating switch 20, a corresponding operation signal (operation data) is input to the CPU core 42 via the I/F circuit 54. Furthermore, the coordinate data output from the touch panel 22 is input to the CPU core 42 via the I/F circuit 54. In addition, the CPU core 42 reads from the RAM 48 the sound data necessary for the game, such as a game music (BGM), a sound effect or voices of a game character (game object) (onomatopoeic sound), etc., and outputs it from the speaker 32 via the I/F circuit 54.

In the game apparatus 10 of such a configuration, a virtual game, such as the RPG game can be played. In the virtual game of the first embodiment, a player moves a player object in a two-dimensional virtual space to advance the game through battles with the encountered enemy object, capture of the enemy object (hereinafter referred to "capture"), and so forth, and attains a final purpose of defeating a boss.

A game screen 100 shown in FIG. 3 (A) is displayed on the LCD 14. The game screen 100 displays a part of the virtual space (field), and displays a player object 102 and a non player object 104 such as a villager (townspeople), etc. The player object 102 talks with the non player object 104 such as the villager to thereby get content as a clue to progress the game out of him or her. Although illustration is omitted, the touch panel 22 is set on the LCD 14 as described above. Accordingly, by dragging the player object 102 on the LCD 14 with a stick or the like 24, it is possible to move the player object 102 within the field. However, the player object 102 can be moved by the operating switch 20 (cross switch 20a).

Figure 5:
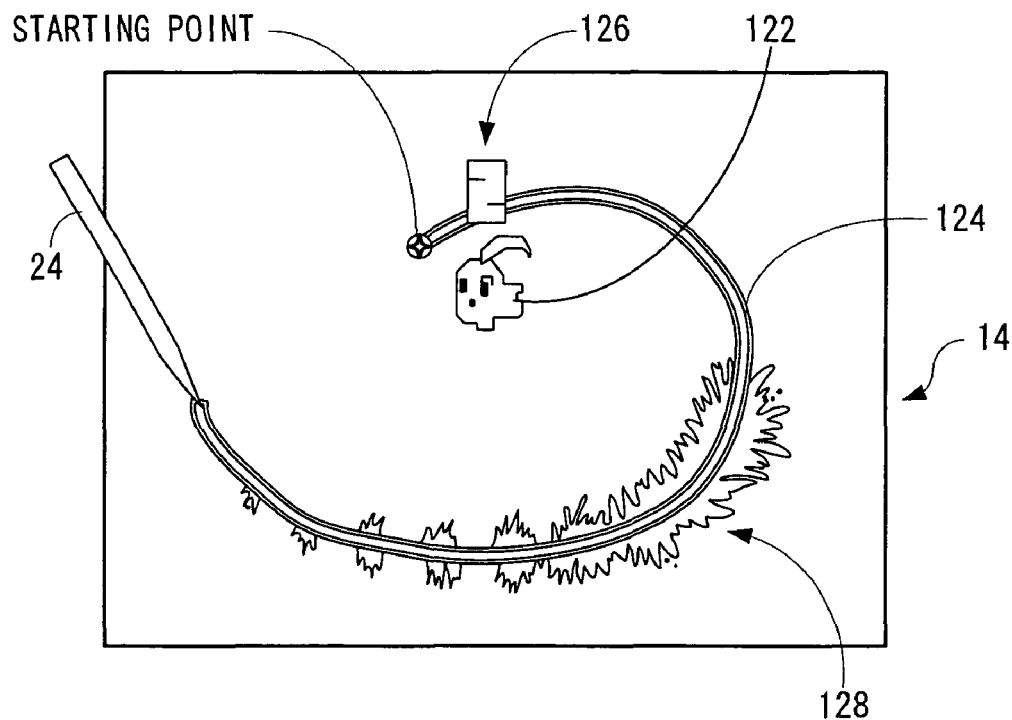
FIG. 5 is an illustrative view showing the other example of a game screen to be displayed on the second LCD in FIG. 1 embodiment.

Additionally, in FIG. 3(A) (this holds true for FIG. 3 (B), FIG. 4 (A), FIG. 4 (B) and FIG. 5), a background object is omitted for simplicity. Although information necessary for the game such as a physical strength value of the player, etc. described later may be visibly displayed (displayed by a bar graph and a numerical value), this is omitted here. However, the information necessary for the game may be displayed on the LCD 12.

FIG. 3 (B) is an illustrative view showing one example of a game screen (hereafter referred to as "capture screen" for convenience of explanation) 120 displayed in a fighting scene on the LCD 14. On the capture screen 120, an enemy object 122 is displayed. The capture screen 120 shown in FIG. 3 (B) is displayed when the player object 102 moves in the field, and encounter the enemy object 122 on the game screen 100 shown in FIG. 3 (A) to thereby shift the display to a fighting scene (fighting mode).

Here, when the player strokes (slides) the touch panel 22 so as to enclose the enemy object 122 with the stick or the like 24, a capture screen 120 shown in FIG. 4 (A) is displayed. Hereafter, for the sake of convenience of description, a stroking operation on the touch panel 22 (LCD 14) with the stick or the like 24 by the player when the capture screen 120 is displayed is called "surrounding operation". In the capture screen 120 shown in FIG. 4 (A), a starting point is a position from which the player starts a surrounding operation, that is, performs a touch-on operation (this holds true for FIG. 4 (B) and FIG. 5). However, in a case that successive surrounding operations are performed, the starting point is updated every time that the closed region is formed by a surrounding operation as described later. Additionally, according to the surrounding operation, a line (hereafter referred to as "surrounding line") 124 is displayed as shown in FIG. 4 (A). In this embodiment, the CPU core 42 detects coordinate data input from the touch panel 22 every predetermined time period (one frame, for example), and calculates a line segment connecting a position on the LCD 14 indicated by a previously detected coordinate data and a position on the LCD 14 indicated by a currently detected coordinate data. However, one frame is a screen updating rate (1/60 seconds). Then, the line segment calculated according to an instruction from the CPU core 42 is displayed on the LCD 14. Through repletion of such a process, the surrounding line 124 shown in FIG. 4 (A) is displayed.

However, as described above, the resolution of the LCD 14 and the detection accuracy of the touch panel 22 are set to the same, and therefore if the respective coordinates system is the same, the coordinate data input from the touch panel 22 can directly be utilized as coordinate data of the LCD 14.

Additionally, as shown in FIG. 4 (A), a character 126 (number "2" in FIG. 4 (A)) denoting the number of surroundings required to capture the enemy object 122 is displayed above the enemy object 122. The number of surroundings is set in advance corresponding to the enemy object 122 as described later (see FIG. 10 (A)), and the set numerical value is displayed by the character 126.

In the first embodiment, the player has to successively surround the enemy character 122 with the stick or the like 24 more than the number of surroundings set corresponding to the enemy object 122 in advance in order to capture the enemy object 122. Strictly speaking, if the enemy object 122 exists in the closed region formed by the surrounding line 124 drawn with the stick or the like 24, it is determined that the enemy object 122 is surrounded, and such a determination has to be successively performed more than the number of surroundings.

It should be noted that a description of the determination for surrounding the enemy object 122 is described in detail below, and therefore, the detailed description will be omitted here.

In addition, while the player performs a surrounding operation, if the enemy object 122 contacts or hits the surrounding line 124, the surrounding line 124 is cut off, and erased. At this time, the physical strength (or the life) of the player object 102 is subtracted by a predetermined amount. However, durability is set to the surrounding line 124 as described later to determine whether or not the surrounding line 124 is to be cut off depending on the number of the contacts or hits of the enemy object 122. Furthermore, when the surrounding line 124 is cut off and erased, the number of surroundings of the enemy object 122 at that time is invalid (reset).

Although illustration is omitted, if the player stops the surrounding operation, that is, if he or she performs a touch-off operation, the surrounding line 124 is erased, and the number of surroundings of the enemy object 122 at that time becomes invalid.

Furthermore, in a case that the enemy object 122 contacts, hits, and so forth the surrounding line 124, the surrounding line 124 is cut off. However, also, in a case that the attack of the enemy object 122 (releases fire and water, for example) hits the surrounding line 124, the surrounding line 124 may be cut off. It should be noted that in this case also, the durability is set to the surrounding line 124.

When the player successively surrounds the enemy object 122 more than the number of surroundings set to the enemy object 122, although illustration is omitted, the player object 102 succeeds capturing the enemy object 122. Although described in detail, by selecting (utilizing) the captured enemy object 122, the player object 102 can exert an ability (effect) belonging to the enemy object 122 in the next surrounding operation and the following, that is, in capturing another enemy object 122. That is, the captured enemy object 122 exerts an influence on a surrounding operation by helping (assisting) the surrounding operation.

It should be noted that if an enemy object 122 existing on the field and a captured enemy object 122 have to be distinguished from each other, the captured enemy object 122 may be called "affecting object".

For example, if the affecting object whose attribute is "grass" is selected, and when a surrounding line 124 is drawn as shown in FIG. 5, the effect object 128, such as vegetation is displayed along the surrounding line 124. The effect object 128 functions as a wall, and restricts a movable range of the enemy object 22. Accordingly, it is possible to make the movable range of the enemy object 122 narrower and facilitate the surrounding operation.

Although illustration is omitted, when the affecting object whose attribute is "fire" is selected, the effect object 128, such as a flame (fire) is displayed along the surrounding line 124. By means of the effect object 128, it is possible to attack the enemy object 122. That is, when the enemy object 122 contacts the effect object 128 of the flame, the enemy object 122 is damaged to thereby reduce its moving speed and stop the movement. Thus, it is possible to facilitate the surrounding operation.

Additionally, the effect object 128 shown in FIG. 5 is a simple example, and an effect (player's assistance) is set for each of the affecting objects (enemy object 122) (see FIG. 10 (A)).

In the first embodiment, a time period during which the effect object 128 can be generated according to the player's surrounding operation is set to a fixed period of time (effective time). This is because that if the effect object 128 can be generated for an indefinite period, the enemy object 122 can be surrounded very easily, and the player gets tired of playing the game without delay. However, the effective time may be set to different values depending on the affecting object (attribute thereof). Also, it is possible to set the effective time on the basis of the attribute of the enemy object 122 and the attribute of the affecting object. In addition, the effective number of times can be set in place of the effective time.

In addition, in the first embodiment, a difficulty level of the surrounding operation is facilitated by generating the effect object 128. Conversely, if a difficulty level of the surrounding operation is advanced, such an effective time and an effective number of times should be set. If the difficulty level of the surrounding operation is advanced, when the effect object 128 is generated for an indefinite period, the game excessively becomes difficult.

Although not illustrated in the drawings, if the affecting object is selected, the line segment, that is, the surrounding line 124 is displayed by the color decided depending on the attribute of the affecting object. For example, if the attribute of the affecting object is "water", the surrounding line 124 is displayed in blue, and if the attribute of the affecting object is "fire", the surrounding line 124 is displayed in red. However, if no affecting object is selected, the surrounding line 124 is displayed in a color (grays for example) by default.

Here, a description is made on the surrounding determination of the enemy object 122 by utilizing FIG. 6 and FIG. 7.

FIG. 6 (A) shows a state in which the player clockwise performs a surrounding operation from a starting point to surround the enemy object 122 by the surrounding line 124. As described above, the CPU core 42 detects coordinate data input from the touch panel 22 for each frame, and detects a position on the LCD 14 (position coordinate) indicated by the detected coordinate data. After storing the detected position coordinate (detected coordinate) in a time series in the RAM 48, and the CPU core 42 calculates the line segment connecting a previously detected coordinate and a currently detected coordinate. However, if the detected coordinate stored in the RAM 48 is one, the CPU core 42 determines that the surrounding operation is started without calculating the line segment.

Additionally, if the detected coordinate is equal to or more than three, the CPU core 42 determines whether or not a currently calculated line segment (current line segment) is cross with the line segment (previous line segment) calculated before. As shown in FIG. 6 (A), if the current line segment is cross with the previous line segment, it is determined that a closed region is generated (formed), and by regarding the intersection as a starting point, the closed region including the intersection is set as shown in FIG. 6 (B). That is, the closed polygon including the intersection is set as a surrounded figure. However, if the current line segment is not cross with the previous line segment, it is determined that the closed region is not formed.

Here, although illustration is omitted, a surrounding line 124 is drawn (displayed) according to the surrounding operation by the player from a touch-on (input-present) state to a touch-off (input-absent) state. However, the length of the surrounding line 124 drawable at one time is determined as a constant distance, and if it exceeds the constant distance, the oldest detected coordinate is erased, and the corresponding line segment (a part of the surrounding line 124) is also erased. This is because that no limit is placed on the length of the surrounding line 124 drawable at one time, the enemy object 122 can easily be surrounded, and therefore, the player gets tired of playing the game without delay. It should be noted that "the length of the surrounding line 124 drawable at one time" means the length of the surrounding line 124 drawn from the touch-on to the touch-off, or the length summing the surrounding lines 124 drawn in one attack scene (offensive turn).

As described above, when the closed region is set, it is determined whether or not the enemy object 122 exists within the closed region. That is, a surrounding determination as to the enemy object 122 is performed. More specifically, as shown in FIG. 7 (A), the surrounding determination is performed by utilizing the straight line L1 drawn upward from the enemy object 122 and the straight line L2 drawn leftward from the enemy object 122. In the surrounding determination, it is determined whether or not the straight line L1 and the line segment (surrounding line 124) forming the closed region are cross with each other, and if they are cross, the number of intersections (referred to as "first number of times" for the sake of convenience of description) is detected. However, if the straight line L1 and the line segment forming the closed region is not cross with each other, the first number of times is 0. Next, it is determined whether or not the straight line L2 and the line segment forming the closed region are cross with each other, and if they are cross, the number of intersections (referred to as "second number of times" for the sake of convenience of description) is detected. However, if the straight line L2 and the line segment forming the closed region is not cross with each other, the second number of times is 0. If each of the first number of times and the second number of times is an odd number, it is determined that the enemy object 122 is within the closed region. Accordingly, in the state of FIG. 7 (A), each of the first number of times and the second number of times are "1", and it is determined that the enemy object 122 is within the closed region. On the other hand, if any one of the first number of times and the second number of times is an even number (including 0), it is determined that the enemy object 122 is out of the closed region.

The reason why such a surrounding determination is performed is that the closed region according to the surrounding operation by the player is not limited to the circle. For example, as shown in FIG. 7 (B), when considered on a case that the enemy object 122 is surrounded by a heart-shaped closed region, the first number of times is "1", and the second number of times is "3", and both of them are an odd number. Although illustration is omitted, if the enemy object 122 goes out of the closed region in FIG. 7 (A) and FIG. 7 (B), it is easily understood that at least one of the first number of times and the second number of times is "0" or an even number (2, 4).

Additionally, the above-described surrounding determination is executed by the CPU core 42 with reference to the detected coordinate data 72f and the position coordinate data (not illustrated) of the enemy object 122 by utilizing the work area of the RAM 48.

Figure 8:
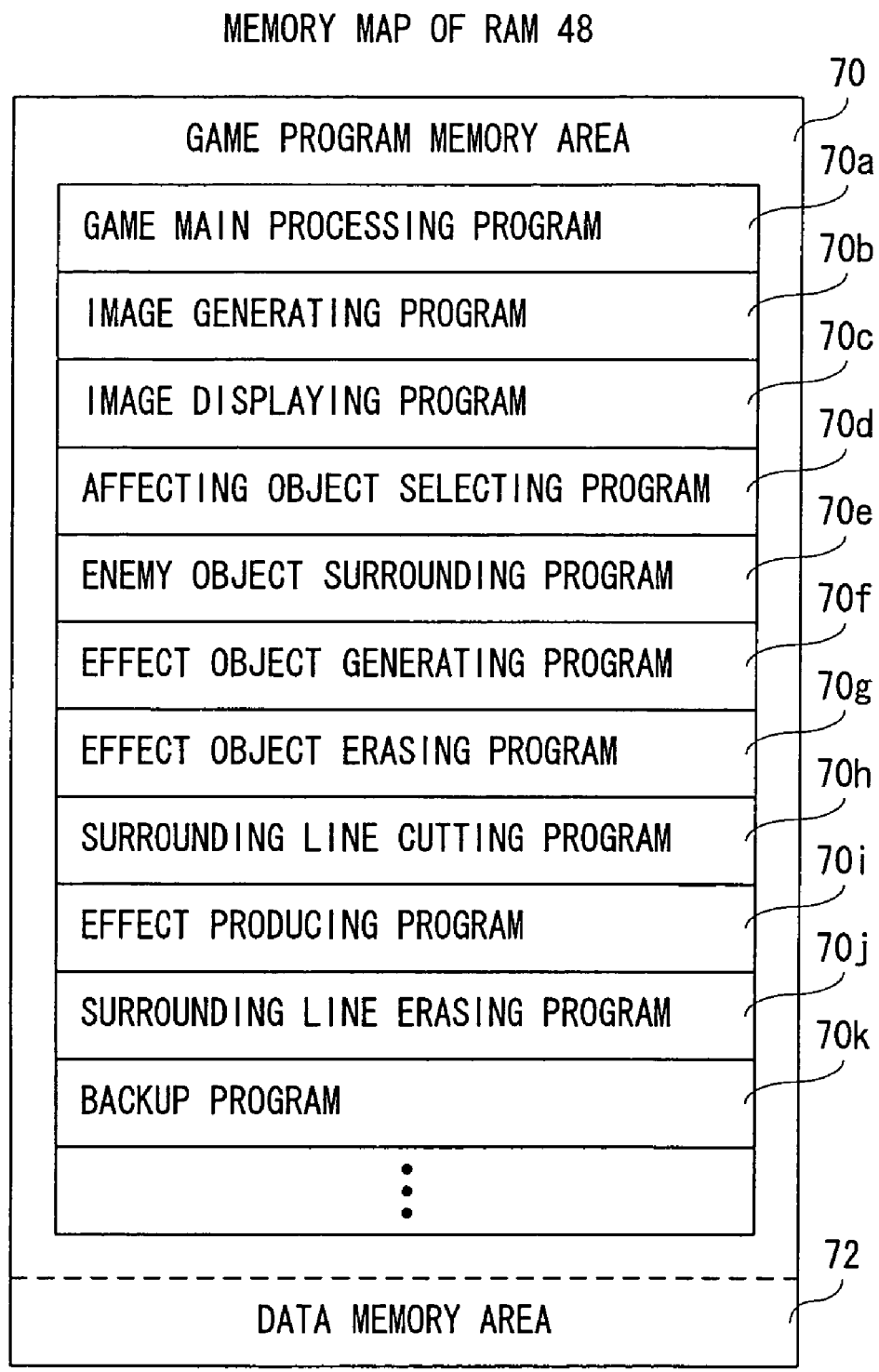
FIG. 8 is an illustrative view showing a memory map of a RAM shown in FIG. 2.

FIG. 8 is a memory map of the RAM 48 integrated in the game apparatus 10 as shown in FIG. 2. With reference to FIG. 8, the RAM 48 includes a game program memory area 70 and a data memory area 72. In the game program memory area 70, a game program is stored. The game program is made up of a game main processing program 70a, an image generating program 70b, an image displaying program 70c, an affecting object selecting program 70d, an enemy object surrounding program 70e, an effect object generating program 70f, an effect object erasing program 70g, an surrounding line cutting program 70h, an effect producing program 70i, an surrounding line erasing program 70j, a backup program 70k, etc.

The game main processing program 70a is a program for processing a main routine of the virtual game in the first embodiment. The image generating program 70b is a program for generating a game image including an object, such as a player object 102, a non player object 102, an item object, a background object, etc. by utilizing the image data 72a described later.

Here, the player object 102 is an object which moves, and so forth in the virtual space according to an operation by the player, and is equal to a moving image object molding a person and an animal, a moving image object as to an animation character, etc. Also, the non player object 102 means an object which moves, and so forth according to the program irrespective of an operation by the player, and is equal to a moving image object molding a person and an animal, a moving image object as to an animation character, etc. similarly to the player object 102. The item object is an object as to an item (weapon, medicine, foods, magical tool, coin, etc.) which is obtained or possessed by the player object 102 or the non player object 102. Also, the item object includes an object of a bullet (or flame, water, ice, bubble, electricity (thunder), etc.) to be shot when the player object 102 attacks the enemy object 122 by utilizing the weapon, etc. The background object is an object as to a background, such as a building, a wall, a floor (ground), a pillar, trees, vegetation, etc.

The image displaying program 70c is a program for displaying a game image (game screen) generated according to the above-described image generating program 70b on the display (LCD 12, 14). The affecting object selecting program 70d is a program for selecting (utilizing) an enemy object 122 that is, an affecting object, captured according to an enemy object surrounding program 70e described later.

The enemy object surrounding program 70e is a program for making a player object 102 capture an enemy object 122 according to a surrounding operation by the player. The effect object generating program 70f is a program for generating an effect object 128 for assisting the player corresponding to an affecting object in a case that the affecting object is selected according to the above-described affecting object selecting program 70d. The effect object erasing program 70g is a program for erasing an effect object 128 generated (displayed on the capture screen 120). In the first embodiment, the program 70g erases the effect object 128 after a lapse of a fixed time period from the generation of the effect object 128. However, the effect object 128 may be erased when the distance (shooting range) between the enemy object 122 and the effect object 128 becomes equal to or more than a constant.

The surrounding line cutting program 70h is a program for cutting a surrounding line 124 in a case that the enemy object 122 contacts or hits the surrounding line 124. For example, a fixed length including a position on which the enemy object 122 touches, etc. out of the surrounding line 124 displayed on the capture screen 120 is erased, whereby a manner in which the surrounding line 124 is cut off is displayed. However, as described later, in a case that the enemy object 122 hits the surrounding line 124, when durability of the surrounding line 124 is equal to or less than 0, the surrounding line 124 is cut off. The effect producing program 70h is a program for causing damage to the enemy object 122 which hits the effect object 128, decreasing its moving speed, stopping its movement, and restricting the movable range of the enemy object 122 in a case that the effect object 128 is generated along the surrounding line 124. Also, the program 70h can extend the length of the surrounding line 124 drawable at one time. In addition, the program 70h can increase (redouble) the number of surroundings of the enemy object 122 more than the number of actual surroundings. However, if the affecting object can attack the enemy object 122 by itself, the program 70h produces a certain effect before start of the surrounding operation (irrespective of the presence or absence of the surrounding operation) when the affecting object is selected according to the above-described affecting object selecting program 70d. For example, fire (flame), water, ice, electricity (thunder), etc. are generated in the game space to thereby damage the enemy object 122. The effect when damage is given to the enemy object 122 is similar to a case that the enemy object 122 contacts the effect object 128.

The surrounding line erasing program 70j is a program for erasing all the surrounding line 124 on the capture screen 120 when the player stops a surrounding operation (touch-off state), cuts the surrounding line 124, and executes a surrounding determination. The backup program 70k is a program for storing (saving) in the RAM 28b of the memory card 28 the game data (proceeding data or result data) stored in the RAM 48 in response to a player's instruction and according to an occurrence of a certain event.

Although illustration is omitted, in the game program memory area 70, a sound outputting program for outputting a sound necessary for the game, such as voices or onomatopoeic sounds of game objects such as a player object 102, etc., and music like a sound effect, a BGM, etc. are also stored.

Figure 9:
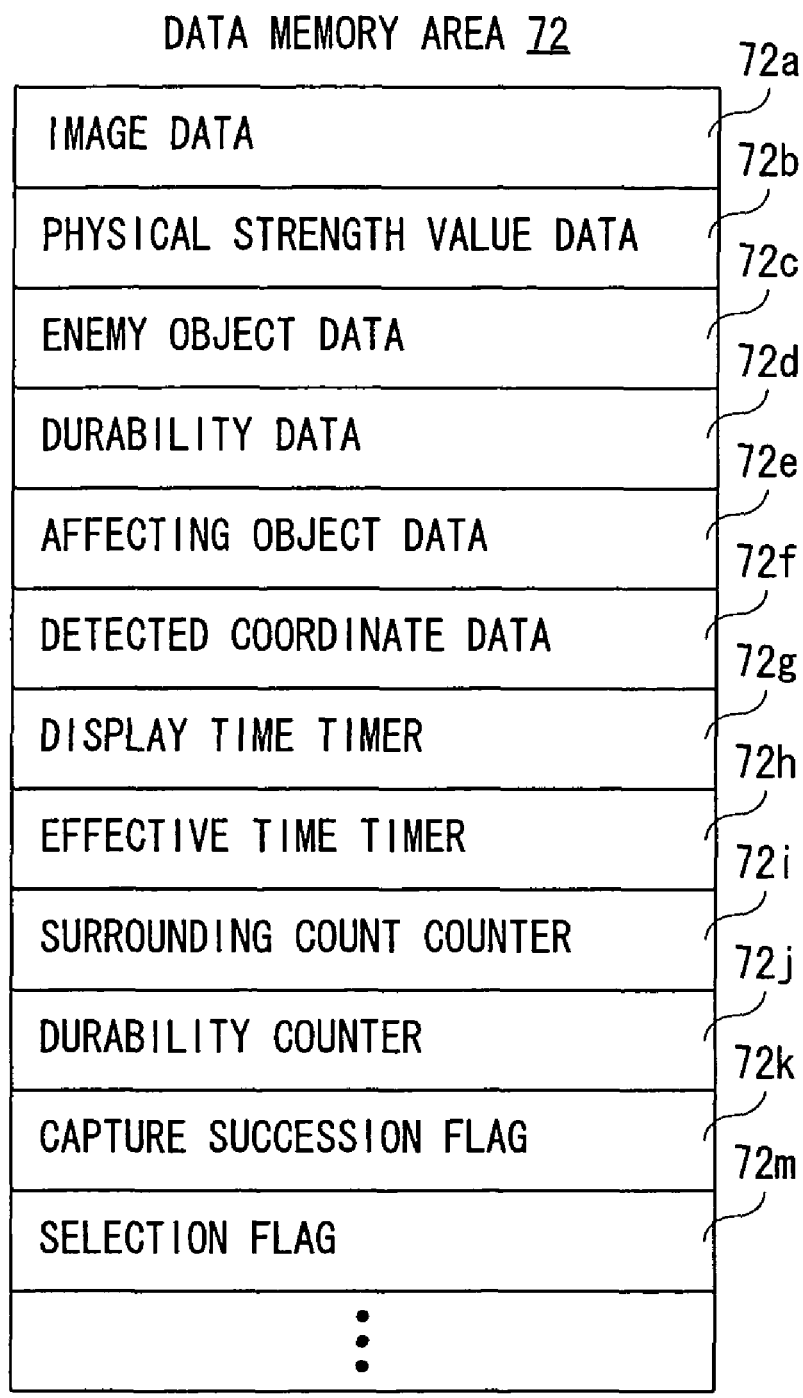
FIG. 9 is an illustrative view showing a data memory area shown in FIG. 8.

As shown in FIG. 9, in the data memory area 72, image data 72a, physical strength value data 72b, enemy object data 72c, durability data 72d, affecting object data 72e, detected coordinate data 72f, etc. are stored.

The image data 72a is data for generating a game image (polygon data, texture data, etc.) as described above. The physical strength value data 72b is a physical strength value and a life value of the player object 102. In the first embodiment, the physical strength value has an initial value determined depending on the level and the experience of the player or the player object 102, and subtracted by a predetermined amount when the surrounding line 124 is cut off. However, the subtracted amount may variably be set depending on the length of the surrounding line 124 at a time of cutting. If the physical strength value is eradiated (equal to or less than 0), the player object 102 dies, and the game may be over under certain circumstances.

The enemy object data 72c is table data defining (describing) an attribute (characteristics), etc. as to each of the enemy object 122. More specifically, as shown in FIG. 10 (A), in the enemy object data 72c, an attribute, the number of surroundings, and a content of player's assistance are described in correspondence with the name. In the name field, a name or identification information of the enemy object 122 is described. In FIG. 10 (A), as a name of the enemy object 122, enemy objects A, B, C, D, E, F, . . . are described. In the attribute field, a corresponding attribute of the enemy object 122 is described. The attribute indicates kinds of the enemy object 122 and classified into water, fighting, electricity, grass, ice, vice, etc. . . . . In the field of the number of surroundings, the number of surroundings (a maximum value of the number of surroundings) required to succeed in capturing the corresponding enemy object 122 is described. In the field of the player's assistance, an effect for changing (facilitating, for example) the difficulty level of the surrounding operation when the player captures the enemy object 122 is described. More specifically, the player has a corresponding enemy object 122 as an affecting object, and when he or she selects (utilizes) the affecting object in capturing another enemy object 122, the effect described in the field of player's assistance is produced.

For example, when an enemy object A as the affecting object is selected, an effect object 128, such as water is squirted along the surrounding line 124 drawn when the player makes an surrounding operation. When the enemy character which the player wants to capture contacts or hits the effect object 128 of the water, the enemy character is damaged to slow down the movement.

Alternatively, when an enemy object B as an affecting object is selected, the number of surroundings of the enemy object 122 is increased (doubled) when making a surrounding operation. For example, if the enemy object 122 is surrounded three times by a surrounding operation of the player, the number of surroundings by the surrounding operation is set to six. That is, the number of surrounding operations is reduced.

Additionally, when the enemy object C as an affecting object is selected, this is the same as the case where the enemy object A is selected except for that the effect object 128, such as electricity or thunder is produced according to the surrounding operation, and therefore, the same description will be omitted.

Also, when the enemy object D as an affecting object is selected by the player, an effect object 128, such as grass is generated according to the surrounding line 124 drawn when the player performs an surrounding operation, the effect object 128 of the grass functions as a wall to limit (restrict) the movable range of the enemy object 122 which is currently to be captured. That is, the movable range is made narrower.

In addition, if the enemy object E as an affecting object is selected, an effect object 128, such as ice is generated according to the surrounding line 124 drawn when the player performs a surrounding operation. When the enemy object 122 which is to be currently captured contacts or hits the ice, the enemy object 122 freezes to thereby stop the movement.

Also, if the enemy object F as an affecting object is selected, the length of the surrounding line 124 which is drawable in the surrounding operation by the player is extended. Thus, when the length of the surrounding line 124 is extended, a relatively large range can be surrounded.

Thus, when the affecting object is selected, in capturing the enemy object 122, an attack, etc. corresponding to the affecting object is added to the enemy object 122 to slow and stop its movement. Thus, it is possible to facilitate a surrounding operation. Also, under certain circumstances, the number of surrounding operations is doubled, or the surrounding line 124 is extended, thus, making it easy to perform the surrounding operation.

Although illustration is omitted, as described above, some of the enemy object 122 as an affecting object can attack by itself the enemy object 122 which the player wants to capture before the player starts a surrounding operation. In such a case, when the affecting object is selected, an attack corresponding to the attribute of the affecting object can be executed on the enemy object 122 irrespective of the presence or absence of the surrounding operation. For example, if the attribute of the affecting object which can attack by itself is "water", the water is splashed with the enemy object 122, or the enemy object 122 is trapped in the water. Alternatively, if the attribute of the affecting object which can attack by itself is "electricity", lightning strikes the enemy object 122. This is a merely illustration and should not be limited, and is an item set by game programmers or developers et al.

In addition, the enemy object data 72c is merely illustration, and it is not limited thereto. That is, it is an item set by game programmers or developers, and can take different variations.

Returning to FIG. 9, the durability data 72d is table data for determining durability of the surrounding line 124 (the number of contacts (hits) of the enemy object 122) by the attribute of the affecting object and the attribute of the enemy object 122 if the player selects an affecting object. More specifically, as shown in FIG. 10 (B), the attribute of the affecting object (referred to as "affection" in FIG. 10 (B)) is described in the vertical direction, and the attribute of the enemy object 122 (referred to as "enemy" in FIG. 10 (B)) is described in the horizontal direction. According to the durability data 72d, from the attribute of the affecting object and the attribute of the enemy object 122, durability, specifically, an initial value to be set to the durability counter 72j described later is determined. For example, if the attribute of the affecting object is "electricity", and the attribute of the enemy object 122 is "water", "5" is set as an initial value of the durability counter 72j. Although detailed description is omitted, in other cases, the initial value of the durability counter 72j is similarly set.

Also, the durability data 72d is a merely illustration, and not restricted. These are items set by game programmers and developer, and can take different variations.

Furthermore, the attribute of the affecting object and the attribute of the enemy object 122 are obtained from the above-described enemy object data 72c.

Returning to FIG. 9, the affecting object data 72e is data as to the enemy object 122 which the player object 102 captures and currently possesses, that is, the affecting object. For example, the affecting object data 72e is a register having bits corresponding to each of the enemy objects 122. A data value "1" is set to the bit corresponding to the enemy object 122 the player object possesses, that is, the affecting object, and a data value "0" is set to the bit corresponding to the enemy object 122 which the player object does not possess. The detected coordinate data 72f is data for storing according to the time sequences coordinates (detected coordinate) on the LCD 14 corresponding to the coordinate data input from the touch panel 22.

Although illustration is omitted, in the data memory area 72, sound (music) data for outputting a sound necessary for the game is also stored. The physical strength value data 72b and the affecting object data 72e, as described above, are updated in accordance with the progress of the game, and are included in the game data (proceeding data and result data). Although not illustrated, the level, etc. of the player object 102 (or player) is also included in the game data.

Furthermore, in the data memory area 72, a display time timer 72g, an effective time timer 72h, a surrounding count counter 72i, a durability counter 72j, a capture succession flag 72k, a selection flag 72m, etc. are stored (provided).

The display time timer 72g is a timer for counting a display time (generating period) of the effect object 128. For example, as described above, the effect object 128 is displayed for a fixed time period, and disappears. Different values may be set to the fixed time period for each effect object 128. In such a case, as to the enemy object data 72c, a fixed time period may be set to each of the enemy objects 122. Furthermore, the effective time timer 72h is a timer for counting a time period (effective time) during which the effect object 128 can be generated. As described above, in the first embodiment, a time period during which the effect object 128 can be generated is constant, and after a lapse of the fixed period of time, the effect object 128 cannot be generated. That is, the affecting object disappears (released from the hand of the player object 102), thus, making it impossible to produce the effect. More specifically, in the affecting object data 72e, a data value "0" is set to the bit corresponding to the affecting object (enemy object 122) to be annihilated.

The surrounding count counter 72i is a counter for counting the number of surroundings of the enemy object 122 by the player. In the first embodiment, as to the enemy object data 72c, the number of surroundings set in correspondence to the enemy object 122 is set to the surrounding count counter 72i as a initial value. The counter is decremented when the enemy object 122 exists in the closed region formed by the player's surrounding operation, that is, when the enemy object 122 is surrounded. In the first embodiment, when the count value of the surrounding count counter 72i becomes 0, the capture of the enemy object 122 is successful. More specifically, as to the affecting object data 72e, a data value "1" is set to the bit corresponding to the captured enemy object 122.

The durability counter 72j is a counter for counting durability of the surrounding line 124. As described above, in a case that the affecting object is selected, a numerical value based on the attribute of the enemy object 122 to be captured and the selected attribute of the affecting object is set to the durability counter 72j as an initial value. However, in a case that the affecting object is not selected, the durability is normal, and a default numerical value ("3", for example) is set as an initial value of the durability counter 72j irrespective of the attribute of the enemy object 122 to be captured. The durability counter 72j is decremented when the enemy object 122 contacts (hits) the surrounding line 124. Then, when the count value of the durability counter 72j is 0, the surrounding line 124 is cut off.

The capture succession flag 72k is for determining whether or not the capture of the enemy object 122 is successful, and made up of one-bit register. In a case that the capture of the enemy object 122 is successful, the capture succession flag 72k is turned on (established), and a data value "1" is set thereto. Except for that, the capture succession flag 72k is turned off (is not established), and a data value "0" is set thereto. For example, the capture succession flag 72k is reset (turned off) at a start of the fighting scene.

The selection flag 72m is a flag for determining whether or not the player selects (uses) the affecting object, and is made up of one-bit register. In a case that the player selects the affecting object, the selection flag 72m is turned on, and a data value "1" is set thereto. On the other hand, in a case that the player does not select the affecting object, the selection flag 72m is turned off, and a data value "0" is set thereto.

Although illustration is omitted, in the data memory area 72, other timers, counters, or flags necessary for the game are also provided.

Figure 11:
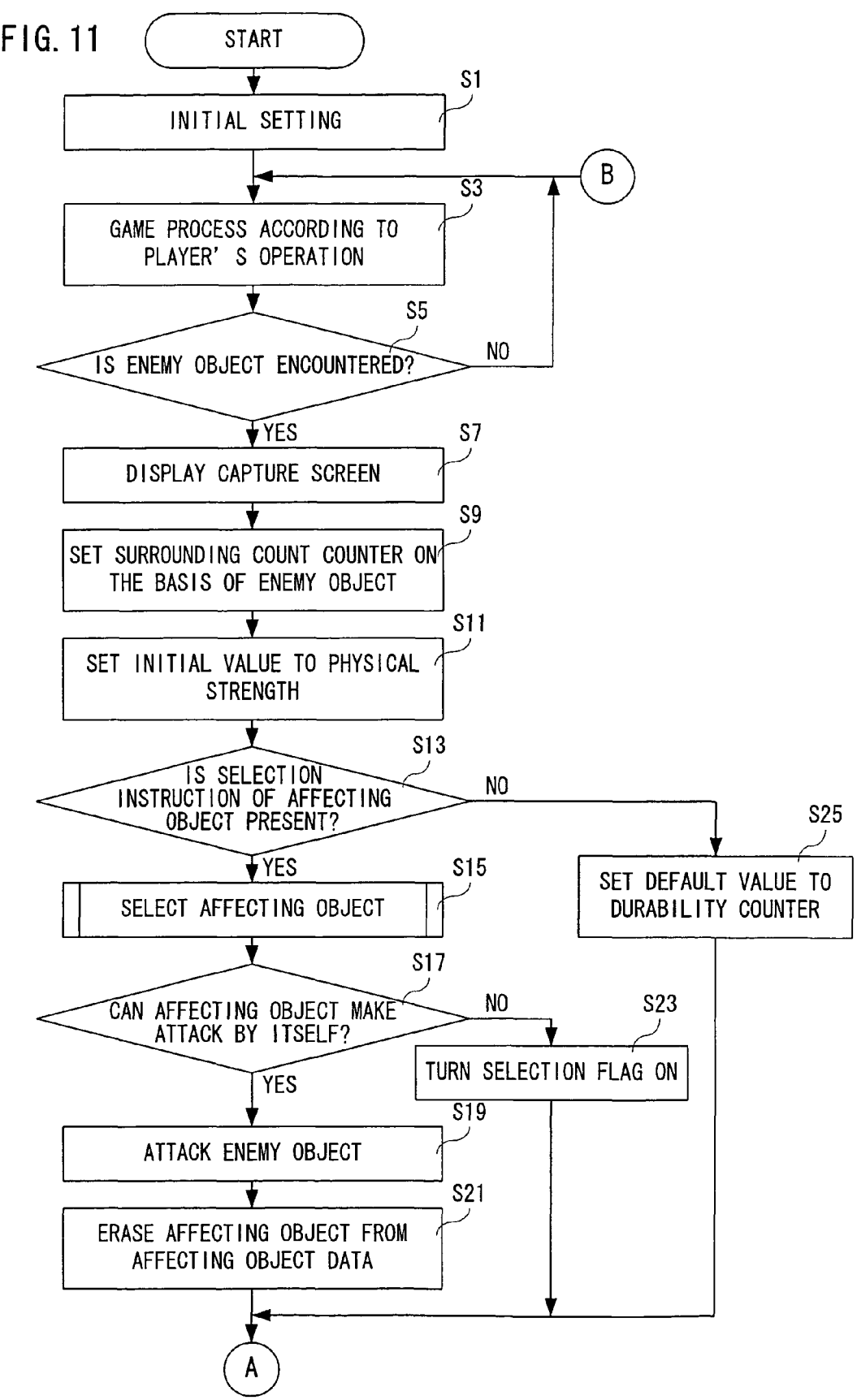
FIG. 11 is a flowchart showing a part of a game entire process of a CPU core shown in FIG. 2.
Figure 12:
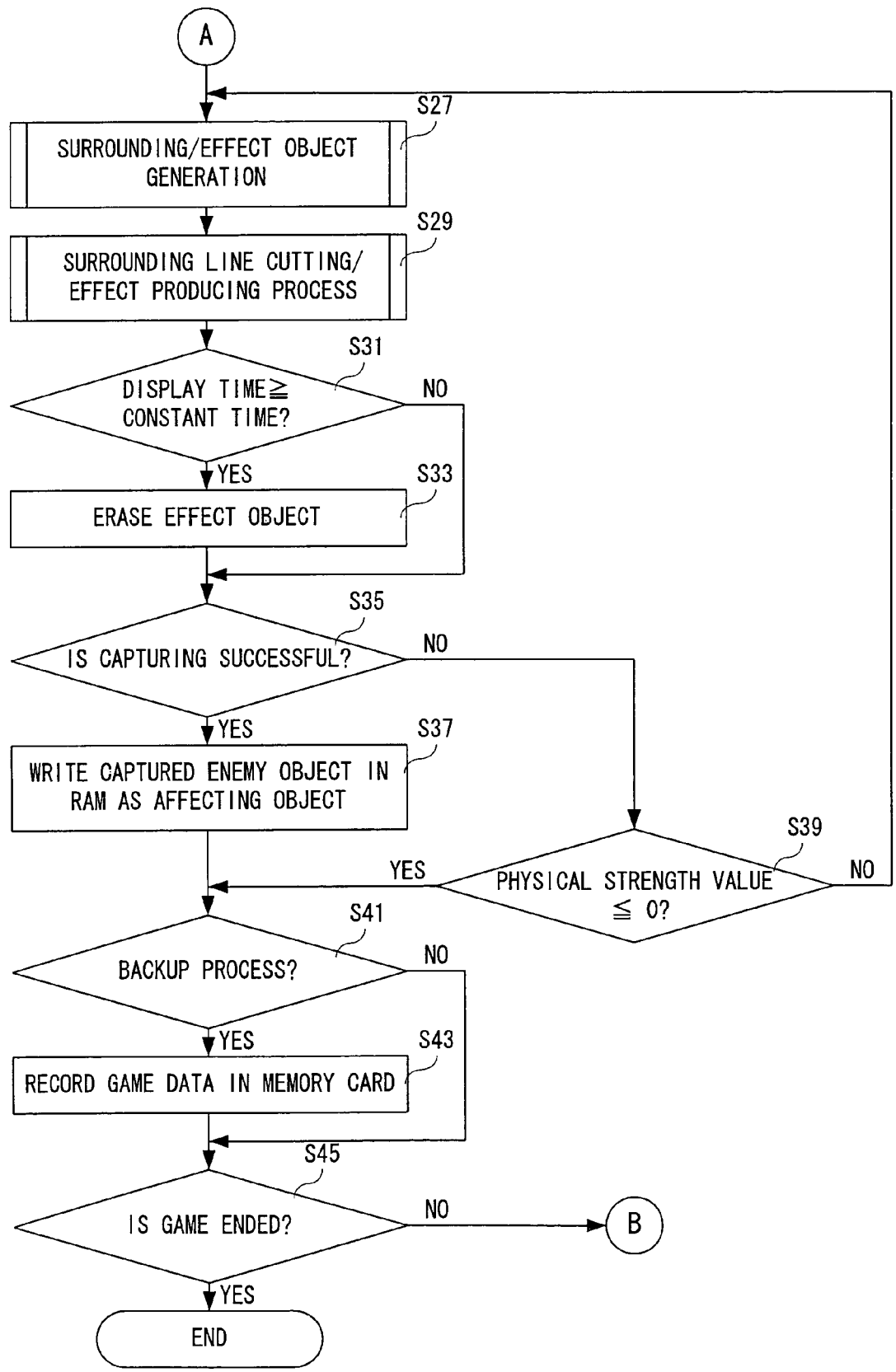
FIG. 12 is a flowchart showing another part of the game entire process of the CPU core shown in FIG. 2, and continued from FIG. 11.

More specifically, the CPU core 42 shown in FIG. 2 executes a game entire process shown in FIG. 11 and FIG. 12. As shown in FIG. 11, when starting the game entire process, the CPU core 42 executes an initial setting in a step S1. For example, the CPU core 42 initializes the RAM 48, reads a game program and data from the ROM 28a of the memory card 28, and writes it to the RAM 48. At this time, in a case that the saved game data is read, the game can be started from a place where the player previously quits.

In a succeeding step S3, a game processing based on an operation by the player is executed. For example, this makes the player object 102 move in the virtual space (field) according to an operation by the player, makes the enemy object 122 move in the field through a processing by a computer (CPU core 42), and displays such a state on the LCD 14 (LCD 12 is possible) of the game screen 100.

In a next step S5, it is determined whether or not the player object 102 encounters the enemy object 122. More specifically, it is determined whether or not the distance between the position coordinate of the player object 102 and the position coordinate of the enemy object 122 is less than a constant. If "NO" in the step S5, that is, if the player object 102 does not encounter the enemy object 122, the process returns to the step S3 as it is. On the other hand, if "YES" in the step S5, that is, if the player object 102 encounters the enemy object 122, the game is shifted to the fighting scene to display the capture screen 120 on the LCD 14 in a step S7. Although illustration is omitted, as described above, the capture succession flag 72k is reset (turned off) at this time. In a succeeding step S9, the surrounding count counter 72i is set on the basis of the enemy object 122 which the player object 102 encounters. That is, with reference to the enemy object data 72c, the number of surroundings is obtained, and the obtained number of surroundings is set as an initial value of the surrounding count counter 72i. Then, in a step S11, an initial value is set to the physical strength value of the player object 102.

Successively, in a step S13, it is determined whether or not a selecting instruction of the affecting object is performed. If "NO" in the step S13, that is, if a selecting instruction of the affecting object is not performed, a default value ("3", for example) is set to a count value of the durability counter 72i in a step S25, and then, the process proceeds to a step S27 shown in FIG. 12. On the other hand, if "YES" in the step S13, that is, if a selecting instruction of the affecting object is performed, an affecting object selecting process (see FIG. 13) described later is executed in a step S15, and it is determined whether or not the selected affecting object can make an attack by itself in a step S17. More specifically, the CPU core 42 determines whether or not the selected affecting object can make an attack by itself according to a content of the player's assistance read in the affecting object selecting process.

If "NO" in the step S17, that is, if the selected affecting object does not make an attack by itself, the selection flag 72m is turned on in order to generate the effect object 128, produce an effect, and so forth in a step S23 as described later, and the process proceeds to a step S27. On the other hand, if "YES" in the step S17, that is, if the selected affecting object can make an attack by itself, it attacks the enemy object 122 in a step S19, and the affecting object is erased in a step S21, and then, the process proceeds to the step S27. That is, in the step S19, an attack (effect) set to the affecting object in advance is produced. Also, in the step S21, a data value "0" is set to the bit corresponding to the affecting object (enemy object 122) as to the affecting object data 72e. Hereafter, this holds true for a case of erasing the affecting object.

As shown in FIG. 12, in the step S27, a surrounding/effect object generating process (see FIG. 14-FIG. 16) described later is executed, and in a next step S29, a surrounding line cutting/effect producing process (see FIG. 17) described later is executed. Succeedingly, in a step S31, it is determined whether or not a display time is equal to or more than a constant time. That is, when the effect object 128 is generated (displayed) in the surrounding/effect object generating process in the step S27, the display time timer 72g is started to determine whether or not the constant time elapses with respect to the display time (timer value). If "NO" in the step S31, that is, if the display time is less than the constant time, the process proceeds to a step S35 as it is. On the other hand, if "YES" in the step S31, that is, if the display time is equal to or more than the constant time, the effect object 128 is erased from the game screen (capture screen 120 in this embodiment) in a step S33, and then, the process proceeds to the step S35. Thus, the effect object 128 is displayed for the constant time.

In the step S35, it is determined whether or not the capture of the enemy object 122 is successful. That is, it is determined whether or not the capture succession flag 72k is turned on here. If "YES" in the step S35, that is, if the capturing of the enemy object 122 is successful, the captured enemy object 122 is stored in the RAM 48 as an affecting object in a step S37, and the process proceeds to a step S41. That is, in the affecting object data 72c, a data value "1" is set to the bit corresponding to the enemy object 122 the player succeeds in capturing. On the other hand, if "NO" in the step S35, that is, if the capture of the enemy object 122 is unsuccessful, it is determined whether or not the physical strength value of the player object 102 is equal to or less than 0 with reference to the physical strength value data 72b in a step S39.

If the physical strength value of the player object 102 is more than 0, "NO" is determined in the step S39, and the process returns to the step S27 to continue the surrounding operation. However, if the physical strength value of the player object 102 is equal to or less than 0, "YES" is determined in the step S39, that is, it is determined that the player object 102 dies, or the game is over, and the process proceeds to the step S41.

In the step S41, it is determined whether or not the backup process is executed. Here, it is determined whether or not a backup process is executed according to an operation by the player and in response to the occurrence of the predetermined event. If "NO" in the step S41, that is, if the backup process is not executed, the process proceeds to a step S45 as it is. On the other hand, if "YES" in the step S41, that is, if the backup process is executed, the game data is stored in the RAM 28b of the memory card 28 in a step S43, and the process proceeds to the step S45.

In the step S45, it is determined whether or not the game ends. Here, it is determined whether or not the game is over, or it is determined whether or not the player instructs a game end. If "NO" in the step S45, that is, if it is not the game end, the process returns to the step S3 shown in FIG. 11. On the other hand, if "YES" in the step S45, that is, if the game ends, the game entire process is ended.

Figure 13:
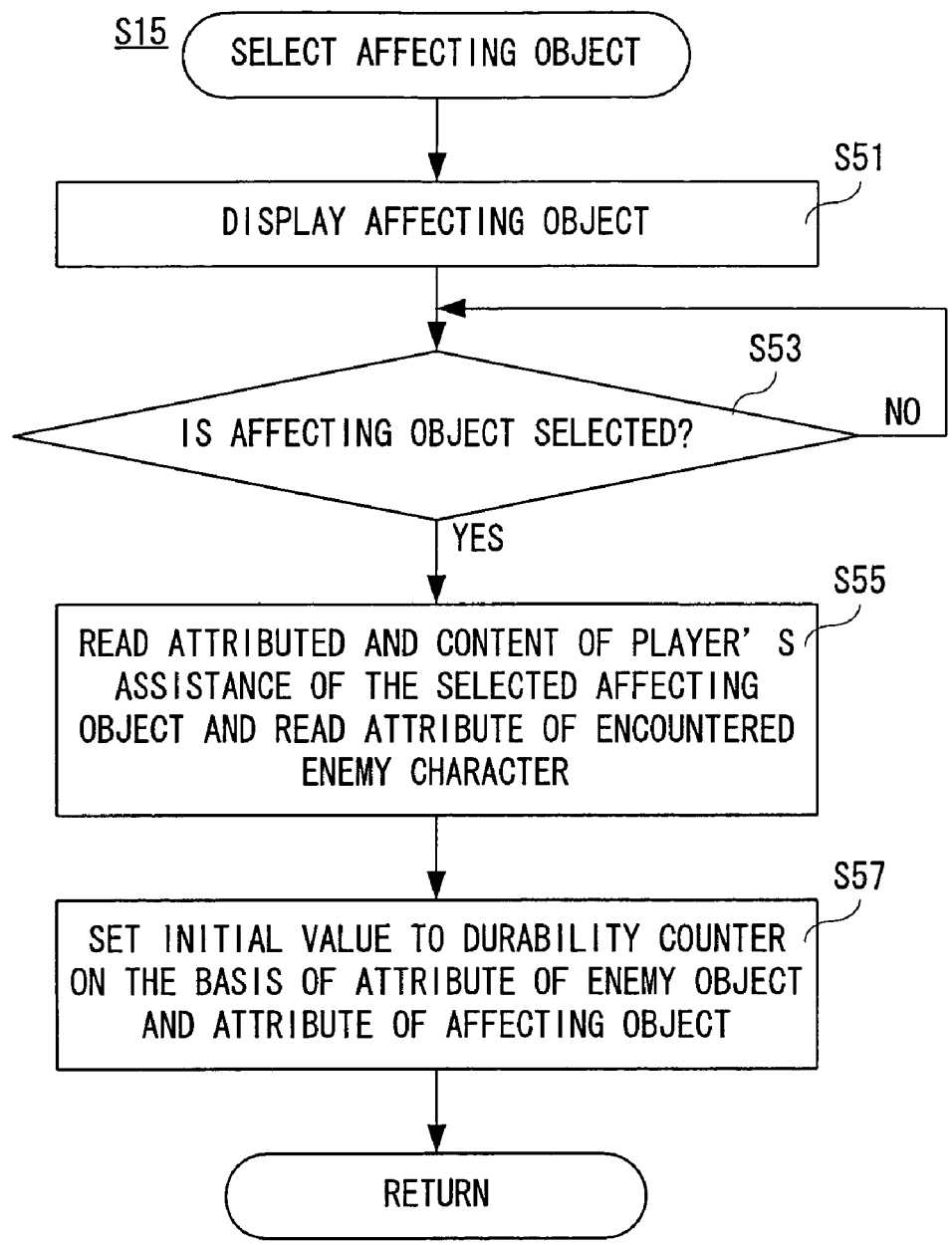
FIG. 13 is a flowchart showing an affecting object selecting process of the CPU core shown in FIG. 2.

FIG. 13 is a flowchart showing an affecting object selecting process in the step S15 shown in FIG. 11. As shown in FIG. 13, when starting the affecting object selecting process, the CPU core 42 displays an affecting object in a step S51. Although illustration is omitted, a selection screen for selecting the affecting object is displayed here. In a succeeding step S53, it is determined whether or not an affecting object is selected. That is, it is determined whether or not an affecting object is selected on the selection screen. If "NO" in the step S53, that is, if the affecting object is not selected, the process returns to the step S53 as it is. It should be noted that if the affecting object is not selected, it is determined whether or not a cancel instruction is performed, and if the cancel instruction is performed, the affecting object selecting process is returned, and if the cancel instruction is not performed, the process may be returned to the step S53.

Furthermore, if "YES" in the step S53, that is, if selection of the affecting object is performed, the attribute and the content of the player's assistance as to the selected affecting object are read, and the attribute as to the encountered enemy object 122 is read in a step S55. Then, in a step S57, an initial value is set to the durability counter 72j on the basis of the attribute of the enemy object 122 and the attribute of the affecting object, and the affecting object selecting process is returned. In the step S57, the initial value according to the durability data 72d is set.

Figure 14:
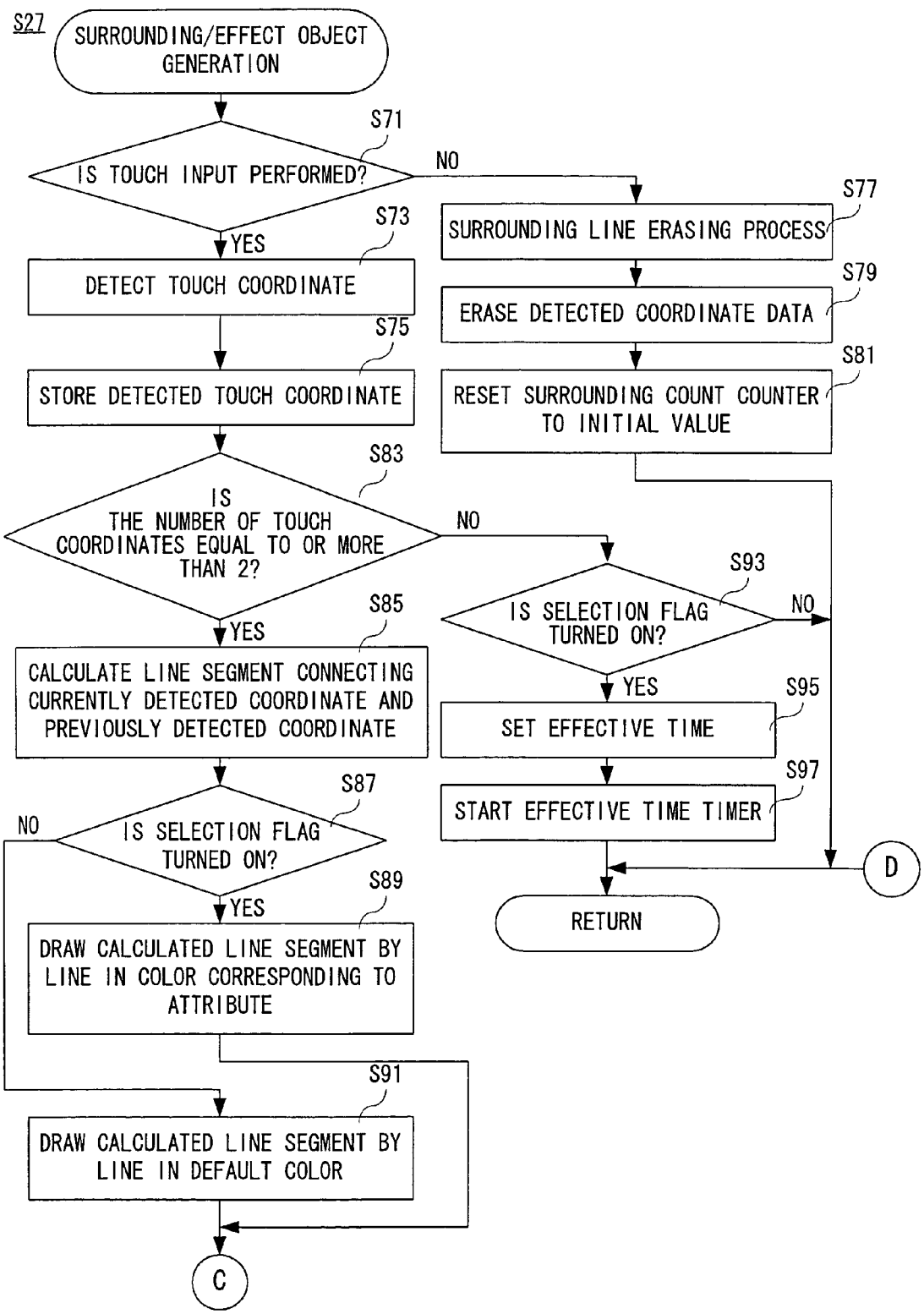
FIG. 14 is a flowchart showing a part of surrounding/effect object generating process of the CPU core shown in FIG. 2.
Figure 15:
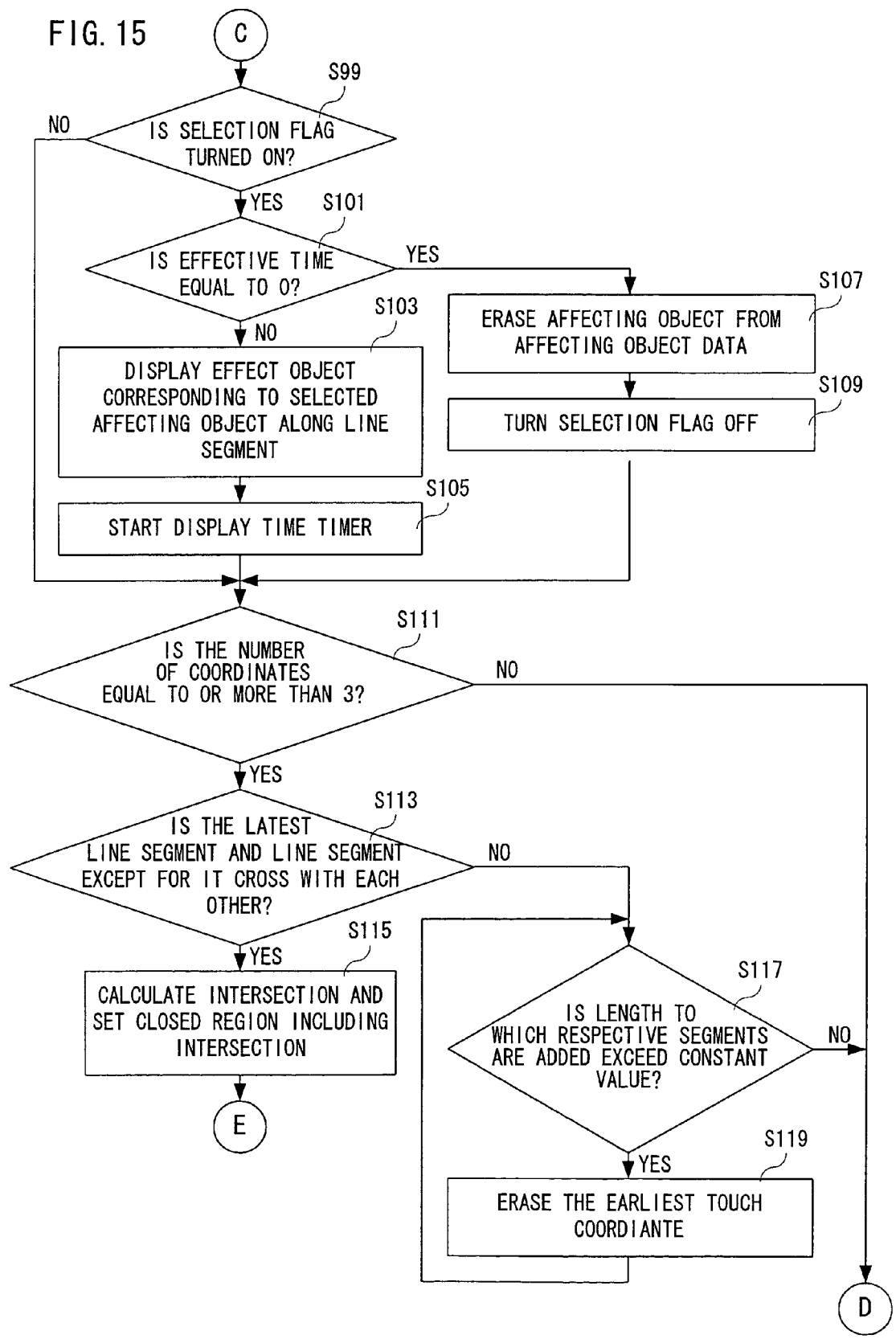
FIG. 15 is a flowchart showing another part of the surrounding/effect object generating process of the CPU core shown in FIG. 2, and continued from FIG. 14.
Figure 16:
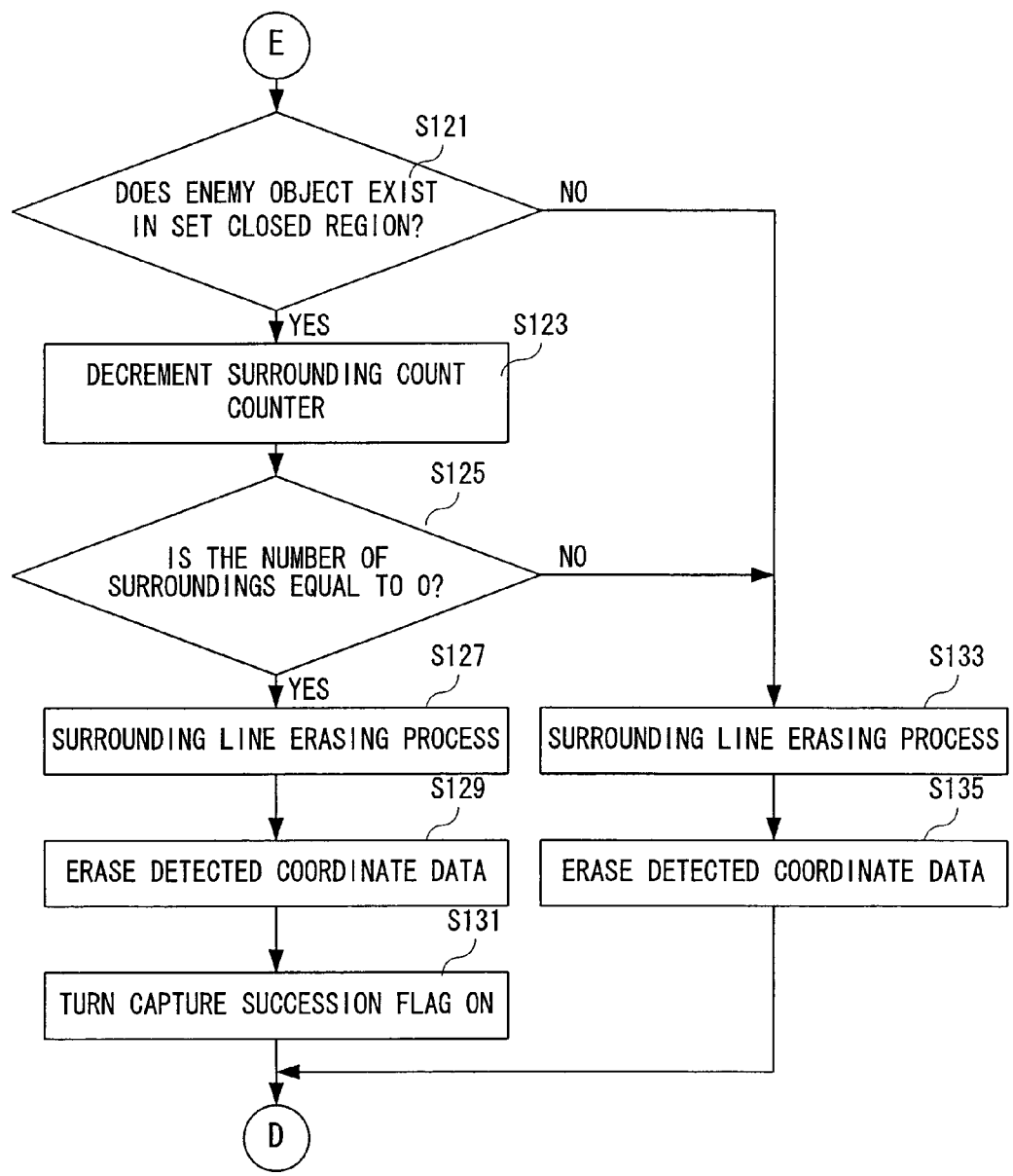
FIG. 16 is a flowchart showing the other part of the surrounding/effect object generating process of the CPU core shown in FIG. 2, and continued from FIG. 14 and FIG. 15.

FIG. 14-FIG. 16 are flowcharts showing the surrounding/effect object generating process in the step S27 shown in FIG. 12. As shown in FIG. 14, when starting the surrounding/effect object generating process, the CPU core 42 determines whether or not a touch input is performed in a step S71. Here, the CPU core 42 determines whether or not coordinate data is input from the touch panel 22. If "NO" in the step S71, that is, if the coordinate data is not input from the touch panel 22, it is determined that a touch-off state is set, and an in a step S77, a surrounding line erasing process is executed. Here, the surrounding line 124 displayed on the capture screen 120 is erased. The same is true for the following. In a succeeding step S79, the detected coordinate data 72f is erased. Then, in a step S81, the surrounding count counter 72i is reset to the initial value, and the surrounding/effect object generating process is returned. However, at a start of the player object 102 encountering the enemy object 122, no surrounding line 124 is drawn, and the enemy object 122 is not surrounded, and therefore, the process is returned as it is without executing the process from the steps S77-S81.

Furthermore, if "YES" in the step S71, that is, if the coordinate data is input from the touch panel 22, a touch coordinate is detected in a step S73. That is, the coordinate (touch coordinate) on the LCD 14 indicated by the coordinate data is detected. In a succeeding step S75, the touch coordinate detected in the step S73, that is, the detected coordinate is stored according to a time series. That is, the detected coordinate data 72f is updated.

In a succeeding step S83, with reference to the detected coordinate data 72f, it is determined whether or not the number of touch coordinates (detected coordinates) is equal to or more than 2. If "NO" in the step S83, that is, if the number of the touch coordinates is 1, it is determined that a touch-on is performed, that is, the surrounding operation is started, and it is determined whether or not the selection flag 72m is turned on in a step S93.

If "NO" in the step S93, that is, if the selection flag 72m is turned off, it is determined the affecting object is not selected, and the surrounding/effect object generating process is returned as it is. On the other hand, if "YES" in the step S93, that is, if the selection flag 72m is turned on, it is determined the affecting object is selected, a constant time is set to the effective time in a step S95, and the effective time timer 72h is started in a step S97, and then the surrounding/effect object generating process is returned.

Furthermore, if "YES" in the step S83, that is, if the number of the touch coordinates is equal to or more than 2, the line segment connecting a currently detected coordinate and a previously detected coordinate is calculated in a step S85, and it is determined whether or not the selection flag 72m is turned on in a step S87. If "YES" in the step S87, the calculated line segment is drawn by the line in the color corresponding to the attribute of the selected affecting object on the screen (capture screen 120) in a step S89, and the process proceeds to a step S99 shown in FIG. 15. On the other hand, if "NO" in the step S87, the calculated line segment is drawn by the line in a default color (gray, for example) on the capture screen 120 in a step S91, and then, the process proceeds to the step S99.

As shown in FIG. 15, in the step S99, it is determined whether or not the selection flag 72m is turned on. If "NO" in the step S99, the process proceeds to a step S111 as it is. On the other hand, if "YES" in the step S99, it is determined whether or not the effective time is 0 in a step S101. That is, it is determined whether or not the effective time timer 72h finishes counting the effective time set in the above-described step S95.

If "NO" in the step S101, that is, if the effective time is not 0, it is determined that the effect object 128 can be generated, and the effect object 128 corresponding to the selected affecting object is displayed according to (along) the line segment (surrounding line 124) in a step S103. Then, in a step S105, the display time timer 72g is started, and the process proceeds to the step S111. However, if "YES" in the step S101, that is, if the effective time is 0, it is determined that the effect object 128 cannot be generated, and the affecting object is erased from the affecting object data 72e in a step S107, and the selection flag 72m is turned off in a step S109, and then, the process proceeds to the step S111.

In the step S111, with reference to the detected coordinate data 72f, it is determined whether or not the number of touch coordinates (detected coordinates) is equal to or more than 3. If "NO" in the step S111, that is, if the number of detected coordinates is equal to or less than 2, the surrounding/effect object generating process is returned as shown in FIG. 14. On the other hand, if "YES" in the step S111, that is, if the number of detected coordinates is equal to or more than 3, it is determined whether or not the latest line segment (currently calculated in a step S85) and the line segment (previous line segment) except for it are cross with each other in a step S113. That is, it is determined whether or not the closed region is formed.

If "YES" in the step S113, that is, if the latest line segment and the line segment except for it are cross with each other, it is determined that the closed region is formed. In a step S115, the intersection is calculated, and the closed region including the calculated intersection is set, and then, the process proceeds to a step S121 shown in FIG. 16. That is, in the step S115, the closed region is set. On the other hand, if "NO" in the step S113, that is, if the latest line segment and the line segment except for it are not cross with each other, it is determined whether or not the length to which the respective line segments are added exceeds a constant value in a step S117. That is, it is determined whether or not the length of the surrounding line 124 drawable at one time is exceeded.

If "NO" in the step S117, that is, if the length to which each line segment is added does not exceed the constant value, the surrounding/effect object generating process is returned as it is. On the other hand, if "YES" in the step S117, that is, if the length to which each line segment is added exceeds the constant value, the oldest (the earliest, temporally) of the touch coordinate (detected coordinate) is erased from the detected coordinate data 72f in a step S119, and the process returns to the step S117. By the processes in the steps S117 and S119, the length of the surrounding line 124 drawable at one time can be restricted.

As shown in FIG. 16, in the step S121, it is determined whether or not the enemy object 122 exists within the set closed region. That is, the above-described surrounding determination process is executed. If "NO" in the step S121, that is, if the enemy object 122 does not exist within the set closed region, it is determined that the enemy object 122 is not surrounded, a surrounding line erasing process is executed in a step S133, the detected coordinate data 72f is erased in a step S135, and then, the surrounding/effect object generating process is returned as shown in FIG. 14.

Furthermore, if "YES" in the step S121, that is, if the enemy object 122 exists within the set closed region, the surrounding count counter 72i is decremented in a step S123, that is, the count value is subtracted by one, and it is determined whether or not the number of surroundings is 0 in a step S125. If "NO" in the step S125, that is, if the number of surroundings is 1 or more, the process proceeds to the step S133 as it is. On the other hand, if "YES" in the step S125, that is, if the number of surroundings is 0, it is determined that capturing the enemy object 122 is successful, a surrounding line erasing process is executed in a step S127, the detected coordinate data is erased in a step S129, the capture succession flag 72k is turned on in a step S131, and then, the surrounding/effect object generating process is returned.

Additionally, a scan time of the process in the steps S27-S35 and S39 shown in FIG. 12 is one frame, and thus, the coordinate data is detected for one frame (constant time period).

Figure 17:
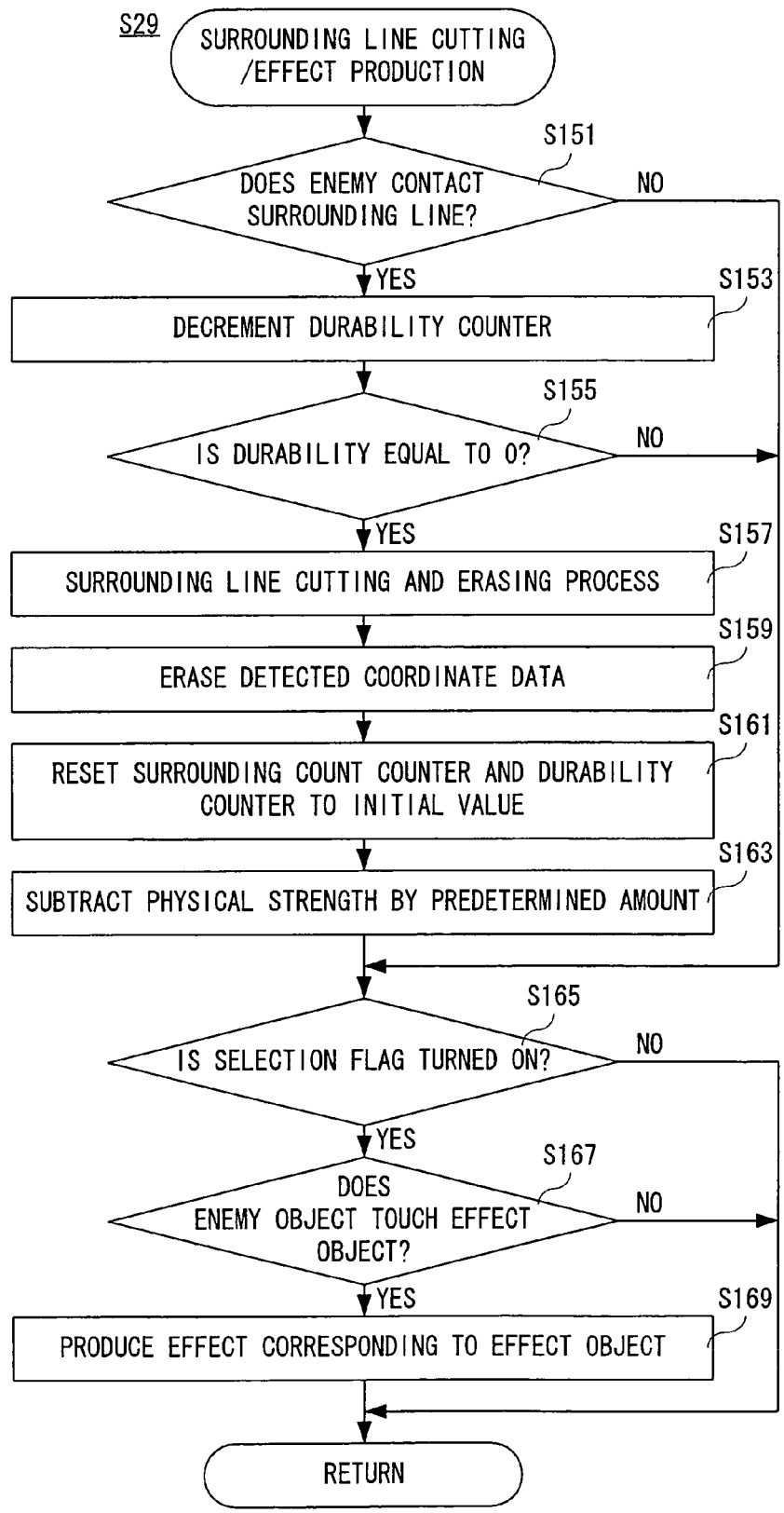
FIG. 17 is a flowchart showing a surrounding line erasing/effect activating process of the CPU core shown in FIG. 2.

FIG. 17 is a flowchart showing the surrounding line cutting/effect producing process in the step S29 shown in FIG. 12. As shown in FIG. 17, when starting the surrounding line cutting/effect producing process, the CPU core 42 determines whether or not the enemy object 122 contacts the drawn surrounding line 124 in a step S151. If "NO" in the step S151, that is, if the enemy object 122 does not contact the surrounding line 124, the process proceeds to a step S165 as it is.

Also, if "YES" in the step S151, that is, if the enemy object 122 contacts the surrounding line 124, the durability counter 72j is decremented in a step S153. Then, in a step S155, it is determined whether or not the durability is 0. That is, it is determined whether or not the count value of the durability counter 72j is 0.

If "NO" in the step S155, that is, if the durability is equal to or more than 1, the process proceeds to the step S165 as it is. On the other hand, if "YES" in the step S155, that is, if the durability is 0, a surrounding line cutting process and a surrounding line erasing process are executed in a step S157. It should be noted that in the surrounding line cutting process, the surrounding line 124 is erased by the range (length) including the position that the enemy object 124 contacts from the capture screen 120. Thereafter, the entire surrounding line 124 is erased by the surrounding line erasing process. In a succeeding S159, the detected coordinate data 72f is erased, in a step S161, the surrounding count counter 72i and the durability counter 72j are reset to the initial value, in a step S163, the physical strength value of the player object 102 is subtracted by a predetermined amount, and then, the process proceeds to the step S165.

In the step S165, it is determined whether or not the selection flag 72m is turned on. If "NO" in the step S165, that is, if the selection flag 72m is turned off, it is determined that the affecting object is not selected, and the surrounding line cutting/effect producing process is returned as it is. On the other hand, if "YES" in the step S165, that is, if the selection flag 72m is turned on, it is determined that the affecting object is selected, and it is determined whether or not the enemy object 122 contacts the effect object 128 in a step S167.

If "NO" in the step S167, that is, if the enemy object 122 does not contact the effect object 128, the surrounding line cutting/effect producing process is returned as it is. On the other hand, if "YES" in the step S167, that is, if the enemy object 122 contacts the effect object 128, an effect corresponding to the effect object is produced in a step S169, and then, the surrounding line cutting/effect producing process is returned.

According to the first embodiment, the enemy object which has already been captured is utilized as an affecting object in capturing another enemy object, and this makes it possible to capture the enemy object easily. Thus, it is possible to progress the game while taking the enemy object to be captured into consideration. That is, it is possible to prevent the game being monotonous like a game of merely collecting objects, and therefore, it is possible to increase an interesting of the game.

Second Embodiment

The game apparatus 10 of the second embodiment is the same as the first embodiment except for that every time that an enemy object 122 is surrounded, the success or failure of the capturing is determined at a probability set to the enemy object 122, and therefore, duplicated description will be omitted.

As shown in FIG. 18, as to the enemy object data 72c in the second embodiment, the number of surroundings and probability in each time (success rate of capturing) are set in correspondence with each enemy objects 122. Except for that, the content is the same as that described in the first embodiment. For example, as to the enemy object F, a maximum value of the number of surroundings is "3". That is, for capturing the enemy object F, if the number of surroundings is once, a probability of succeeding in capturing is 10%, if the number of surroundings is twice, a probability of succeeding in capturing is 50%, and if the number of surroundings is three times, a probability of succeeding in capturing is 100%. However, in a case that the maximum value of the number of surroundings is "1", if surrounding the enemy object 122 is successful once, it is possible to succeed in capturing it at a 100% probability. Although detailed description is omitted, this holds true for another enemy object 122.

That is, a part of the surrounding/effect object generating process shown in the first embodiment is different from that of the second embodiment. More specifically, the flowchart shown in FIG. 16 is replaced with the flowchart shown in FIG. 19. A flowchart in FIG. 19 out of the surrounding/effect object generating process is described, and the part described in the first embodiment will be described simply.

Figure 19:
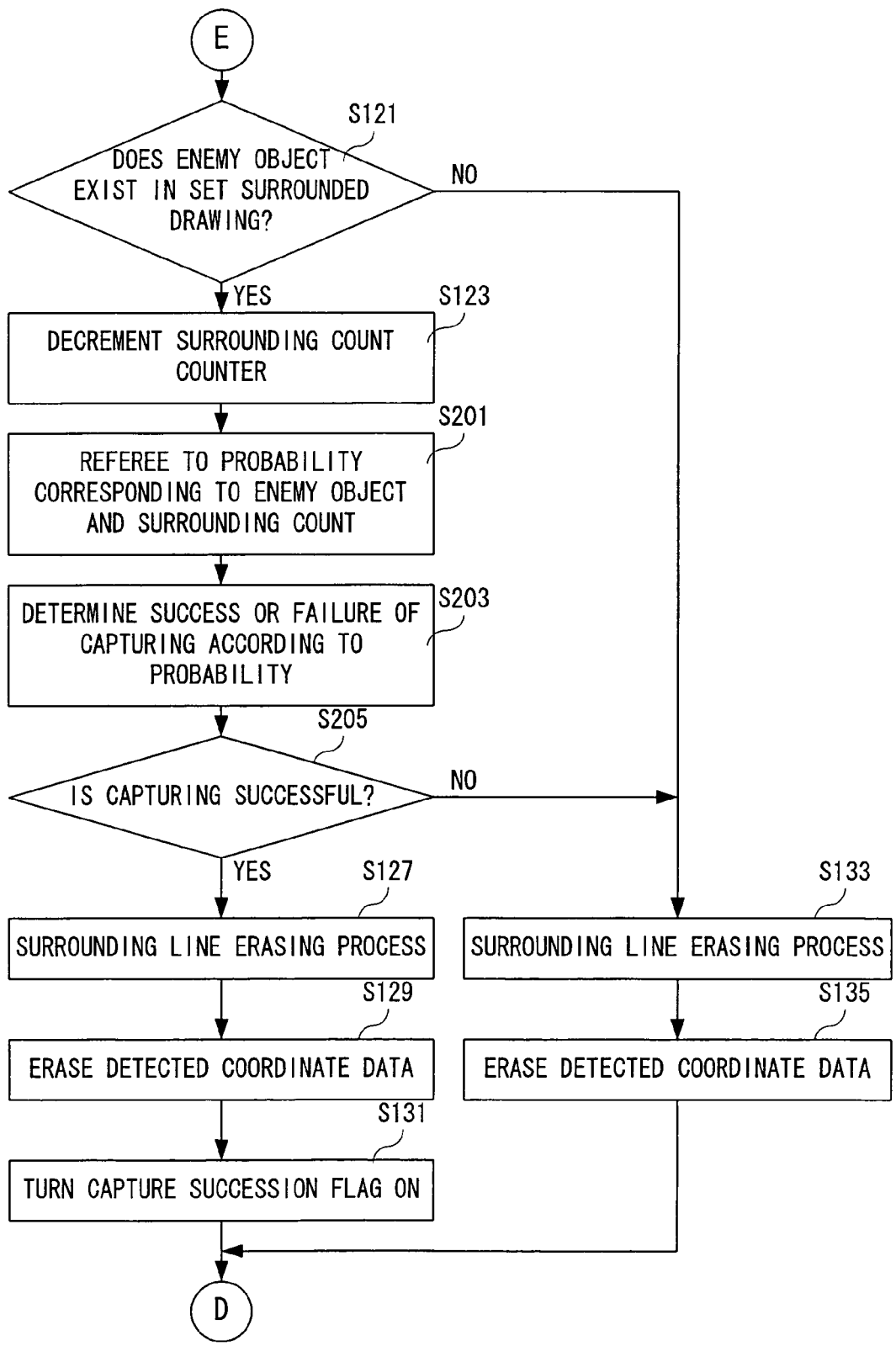
FIG. 19 is a flowchart showing a part of a surrounding/effect object generating process of the CPU core in the second embodiment, and continued from FIG. 14 and FIG. 15.

Referring to FIG. 19, when CPU core 42 determines that the enemy object 122 exists in the closed region formed by the surrounding operation, "YES" is determined in a step S121, and the surrounding count counter 72i is decremented in a next step S123. In a succeeding step S201, probabilities corresponding to the enemy object 122 and the number of surroundings are referred. That is, a probability is obtained with reference to the enemy object data 72c shown in FIG. 18. It should be noted that as understood from the first embodiment, a maximum value of the number of surroundings in the second embodiment is set as an initial value of the surrounding count counter 72i, and therefore, the probability described in correspondence to the numerical value obtained by subtracting the maximum value of the number of surroundings from the count value of the number of surrounding counter 72i is read.

Next, whether or not the capturing is successful is determined according to the probability in a step S203. In a step S205, it is decided (determined) whether or not the capturing is successful. If "NO" in the step S205, that is, if the capturing is unsuccessful, a surrounding line erasing process as described above is executed in a step S133, the detected coordinate data 72f is erased in a step S135, and the surrounding/effect object generating process is returned. On the other hand, if "YES" in the step S205, that is, if the capturing is successful, a surrounding line erasing process is executed in a step S127, the detected coordinate data 72f is erased in a step S129, and the capture succession flag 72k is turned on in a step S131, and the surrounding/effect object generating process is returned.

According to the second embodiment, whether or not the capturing is successful is determined for each of the number of surroundings according to the probability, and therefore, even the enemy object to which a relatively large value of the number of surroundings is set may easily be captured, and therefore, it is possible to enjoy unexpectedness of the game and the surrounding operation in addition to the advantage of first embodiment.

Additionally, in the above-described embodiments, the difficulty level of surroundings is reduced by reducing and stopping a moving speed of the enemy object which contacts the effect object, restricting its movable range, adding (doubling) the number of surroundings, the length of the trace drawable at one time is increased. However, it is not limited thereto, and depending on the contents of the game, the difficulty level of surrounding may be increased by increasing a moving speed of the enemy object which contacts the effect object, and widening the movable range. That is, a surrounding operation can be prevented as well as helped (assisted). Furthermore, it is possible to increase the difficulty level of the surrounding by calculating the number of surroundings so as to be smaller than the actual number of surroundings, or making the length of the locus drawable at one time shorter. Additionally, the affecting object making the difficulty level of surrounding higher and the affecting object making the difficulty level of surrounding lower may be mixed with each other.

Furthermore, although a description is made on the game apparatus integrated with a display in the above-described embodiment, example embodiments of the present invention may be applied to the game apparatus separately provided with the display.

In addition, although in the above-described embodiment, a touch panel is utilized as a pointing device, it is not limited thereto. As another example, a computer mouse, a touch pad or a pen tablet may be utilized. However, in such a case, a pointing image such as a mouse pointer needs to be displayed on the game screen.

Additionally, the configuration of the game apparatus is not limited to that of the above-described embodiment. For example, one LCD is appropriate, or the touch panel may be provided on both of the LCDs. Also, two speakers may be provided side by side.

Although example embodiments of the present invention has have been described and illustrated in detail, it is clearly understood that the same is by way of illustration and example only and is not to be taken by way of limitation, the spirit and scope of the present invention being limited only by the terms of the appended claims.

What is claimed is:

1. A non-transitory, computer-readable storage medium tangibly storing thereon a computer program of a game apparatus having a display that displays an object in a virtual space on a screen and a pointing device that designates at least a position on said screen, where said computer program upon execution by a computer processor of said game apparatus causes the game apparatus to perform a method, the method comprising:
   detecting an input coordinate indicating the position on said screen designated by said pointing device every predetermined time period;
   calculating a line segment connecting a previous input coordinate and a current input coordinate which were detected by said detecting the input coordinate;
   determining whether a closed region is formed by a plurality of line segments calculated by said calculating the line segment;
   determining whether said object is included in said closed region as being surrounded within the closed region when it is determined that said closed region is formed;
   storing obtained information taking said object as an affecting object in a storing memory when it is determined that said object is included in said closed region; and
   changing a difficulty level of surrounding of another object on the basis of the affecting object indicated by the obtained information stored in said storing memory during execution of the computer program by the computer processor of the game apparatus.

2. The non-transitory, computer-readable storage medium storing a game program according to claim 1, wherein changing said difficulty level includes changing a moving speed of said object.

3. The non-transitory, computer-readable storage medium storing a game program according to claim 1, wherein changing said difficulty level includes changing a movable range of said object.

4. The non-transitory, computer-readable storage medium storing a game program according to claim 1, wherein
   a length of a drawable line is constant, and
   changing said difficulty level includes changing said length of the drawable line.

5. The non-transitory, computer-readable storage medium storing a game program according to claim 1, wherein the method further comprises
   displaying the calculated line segment in a color based on an attribute of the affecting object corresponding to the obtained information stored in said storing memory.

6. A non-transitory, computer-readable storage medium tangibly storing thereon a computer program of a game apparatus having a display that displays an object in a virtual space on a screen and a pointing device that designates at least a position on said screen, where said computer program upon execution by a computer processor of said game apparatus causes the game apparatus to perform a method, the method comprising:
   detecting an input coordinate indicating the position on said screen designated by said pointing device every predetermined time period;

calculating a line segment connecting a previous input coordinate and a current input coordinate which were detected by said detecting the input coordinate;

determining whether a closed region is formed by a plurality of line segments calculated by said calculating the line segment;

determining whether said object is included in said closed region as being surrounded within the closed region when it is determined that said closed region is formed;

storing obtained information taking said object as an affecting object in a storing memory when it is determined that said object is included in said closed region;

changing a difficulty level of surrounding of another object on the basis of the affecting object indicated by the obtained information stored in said storing memory;

counting the number of determinations that said object is included in said closed region, and determining whether the counted number of times reaches a predetermined number of times, wherein said storing obtained information taking said object as an affecting object in said storing memory is performed when it is determined that the number of surroundings reaches said predetermined number of times.

7. The non-transitory, computer-readable storage medium storing a game program according to claim 6, wherein the method further comprises resetting the counted number of surroundings when an input coordinate is not detected, or when said object contacts said line segment.

8. The non-transitory, computer-readable storage medium storing a game program according to claim 6, wherein changing said difficulty level includes changing a count value in determining whether the counted number of times reaches the predetermined number of times.

9. A non-transitory, computer-readable storage medium tangibly storing thereon a computer program of a game apparatus having a display that displays an object in a virtual space on a screen and a pointing device that designates at least a position on said screen, where said computer program upon execution by a computer processor of said game apparatus causes the game apparatus to perform a method, the method comprising:

detecting an input coordinate indicating the position on said screen designated by said pointing device every predetermined time period;

calculating a line segment connecting a previous input coordinate and a current input coordinate which were detected by said detecting the input coordinate;

determining whether a closed region is formed by a plurality of line segments calculated by said calculating the line segment;

determining whether said object is included in said closed region as being surrounded within the closed region when it is determined that said closed region is formed;

storing obtained information taking said object as an affecting object in a storing memory when it is determined that said object is included in said closed region;

changing a difficulty level of surrounding of another object on the basis of the affecting object indicated by the obtained information stored in said storing memory; wherein changing the difficulty level includes changing said difficulty level of surrounding for only a fixed period of time, or by a fixed number of times, and the method further comprises erasing the obtained information as to said affecting object from said storing memory when said fixed period of time elapses, or when said fixed number of times is exceeded.

10. A game controlling method of a game apparatus having a display that displays an object in a virtual space on a screen and a pointing device that designates at least a position on said screen, including following steps of:

(a) detecting an input coordinate indicating the position on said screen designated by said pointing device every predetermined time period;

(b) calculating a line segment connecting a previous input coordinate and a current input coordinate which were detected by said step (a);

(c) determining whether a closed region is formed by a plurality of line segments calculated by said step (b);

(d) determining whether said object is included in said closed region when it is determined that said closed region is formed by said step (c);

(e) storing obtained information taking said object as an affecting object in a storing device when it is determined that said object is included in said closed region by said step (d); and (f) changing a difficulty level of surrounding another object on the basis of the affecting object indicated by the obtained information stored in said storing device during the game controlling method of the game apparatus.

11. The method according to claim 10, wherein changing said difficulty level includes changing a moving speed of said object.

12. The method according to claim 10, wherein changing said difficulty level includes changing a movable range of said object.

13. The method according to claim 10, wherein a length of a drawable line is constant, and changing said difficulty level includes changing said length of the drawable line.

14. The method according to claim 10, further comprising displaying the line segment calculated in step (b) in a color based on an attribute of the affecting object corresponding to the obtained information stored in said storing device.

15. A game controlling method of a game apparatus having a display that displays an object in a virtual space on a screen and a pointing device that designates at least a position on said screen, including following steps of:

(a) detecting an input coordinate indicating the position on said screen designated by said pointing device every predetermined time period;

(b) calculating a line segment connecting a previous input coordinate and a current input coordinate which were detected by said step (a);

(c) determining whether a closed region is formed by a plurality of line segments calculated by said step (b);

(d) determining whether said object is included in said closed region when it is determined that said closed region is formed by said step (c);

(e) storing obtained information taking said object as an affecting object in a storing device when it is determined that said object is included in said closed region by said step (d); and (f) changing a difficulty level of surrounding another object on the basis of the affecting object indicated by the obtained information stored in said storing device;

(g) counting the number of determinations that said object is included in said closed region; and (h) determining whether the counted number of times counted reaches a predetermined number of times, wherein said storing obtained information taking said object as an affecting object in said storing device is performed when it is determined that the number of surroundings reaches said predetermined number of times.

16. The method according to claim 15, further comprising resetting the counted number of surroundings when an input coordinate is not detected by said input coordinate detecting, or when said object contacts said line segment.

17. The method according to claim 15, wherein changing said difficulty level includes changing a count value of step (g).

18. A game controlling method of a game apparatus having a display that displays an object in a virtual space on a screen and a pointing device that designates at least a position on said screen, including following steps of:
   (a) detecting an input coordinate indicating the position on said screen designated by said pointing device every predetermined time period;
   (b) calculating a line segment connecting a previous input coordinate and a current input coordinate which were detected by said step (a);
   (c) determining whether a closed region is formed by a plurality of line segments calculated by said step (b);
   (d) determining whether said object is included in said closed region when it is determined that said closed region is formed by said step (c);
   (e) storing obtained information taking said object as an affecting object in a storing device when it is determined that said object is included in said closed region by said step (d); and
   (f) changing a difficulty level of surrounding another object on the basis of the affecting object indicated by the obtained information stored in said storing device; wherein
   changing said difficulty level includes changing said difficulty level of surrounding for only a fixed period of time, or by a fixed number of times, and
   the method further comprises erasing the obtained information as to said affecting object from said storing device when said fixed period of time elapses, or when said fixed number of times is exceeded.

19. A game apparatus having a display that displays an object in a virtual space on a screen and a pointing device that designates at least a position on said screen, comprising:
   an input coordinate detecting programmed logic circuitry that detects an input coordinate indicating the position on said screen designated by said pointing device every predetermined time period;
   a line segment calculating programmed logic circuitry that calculates a line segment connecting a previous input coordinate and a current input coordinate which were detected by said input coordinate detecting programmed logic circuitry;
   a closed region determining programmed logic circuitry that determines whether a closed region is formed by a plurality of line segments calculated by said line segment calculating programmed logic circuitry;
   a surrounding determining programmed logic circuitry that determines whether said object is included in said closed region when it is determined that said closed region is formed by said closed region determining programmed logic circuitry;
   an affecting object storage controlling programmed logic circuitry that stores obtained information taking said object as an affecting object in a storing device when it is determined that said object is included in said closed region by said surrounding determining programmed logic circuitry; and
   a difficulty level changing programmed logic circuitry that changes a difficulty level of surrounding another object on the basis of the affecting object indicated by the obtained information stored in said storing device during operation of the game apparatus.

20. The game apparatus according to claim 19, wherein said difficulty level changing programmed logic circuitry changes a moving speed of said object.

21. The game apparatus according to claim 19, wherein said difficulty level changing programmed logic circuitry changes a movable range of said object.

22. The game apparatus according to claim 19, wherein a length of a drawable line is constant, and said difficulty level changing programmed logic circuitry changes said length of the drawable line.

23. The game apparatus according to claim 19, wherein said game program causes said processor to function as a line segment displaying programmed logic circuitry that displays the line segment calculated by said line segment calculating programmed logic circuitry in a color based on an attribute of the affecting object corresponding to the obtained information stored in said storing device.

24. A game apparatus having a display that displays an object in a virtual space on a screen and a pointing device that designates at least a position on said screen, comprising:
   an input coordinate detecting programmed logic circuitry that detects an input coordinate indicating the position on said screen designated by said pointing device every predetermined time period;
   a line segment calculating programmed logic circuitry that calculates a line segment connecting a previous input coordinate and a current input coordinate which were detected by said input coordinate detecting programmed logic circuitry;
   a closed region determining programmed logic circuitry that determines whether a closed region is formed by a plurality of line segments calculated by said line segment calculating programmed logic circuitry;
   a surrounding determining programmed logic circuitry that determines whether said object is included in said closed region when it is determined that said closed region is formed by said closed region determining programmed logic circuitry;
   an affecting object storage controlling programmed logic circuitry that stores obtained information taking said object as an affecting object in a storing device when it is determined that said object is included in said closed region by said surrounding determining programmed logic circuitry; and
   a difficulty level changing programmed logic circuitry that changes a difficulty level of surrounding another object on the basis of the affecting object indicated by the obtained information stored in said storing device;
   a surrounding count counting programmed logic circuitry that counts the number of determinations that said object is included in said closed region by said surrounding determining programmed logic circuitry, and
   a surrounding count determining programmed logic circuitry that determines whether the number of times counted by said surrounding count counting programmed logic circuitry reaches a predetermined number of times, wherein
   said affecting object storage controlling programmed logic circuitry stores obtained information taking said object as an affecting object in said storing device when it is determined that the number of surroundings reaches said predetermined number of times by said surrounding count determining programmed logic circuitry.

25. The game apparatus according to claim 24, further comprising
a surrounding count resetting programmed logic circuitry that resets the number of surroundings counted by said surrounding count counting programmed logic circuitry when an input coordinate is not detected by said input coordinate detecting programmed logic circuitry, or when said object contacts said line segment.

26. The game apparatus according to claim 24, wherein
said difficulty level changing programmed logic circuitry changes a count value of said surrounding count counting programmed logic circuitry.

27. A game apparatus having a display that displays an object in a virtual space on a screen and a pointing device that designates at least a position on said screen, comprising:
an input coordinate detecting programmed logic circuitry that detects an input coordinate indicating the position on said screen designated by said pointing device every predetermined time period;
a line segment calculating programmed logic circuitry that calculates a line segment connecting a previous input coordinate and a current input coordinate which were detected by said input coordinate detecting programmed logic circuitry;
a closed region determining programmed logic circuitry that determines whether a closed region is formed by a plurality of line segments calculated by said line segment calculating programmed logic circuitry;
a surrounding determining programmed logic circuitry that determines whether said object is included in said closed region when it is determined that said closed region is formed by said closed region determining programmed logic circuitry;
an affecting object storage controlling programmed logic circuitry that stores obtained information taking said object as an affecting object in a storing device when it is determined that said object is included in said closed region by said surrounding determining programmed logic circuitry; and
a difficulty level changing programmed logic circuitry that changes a difficulty level of surrounding another object on the basis of the affecting object indicated by the obtained information stored in said storing device; wherein
said difficulty level changing programmed logic circuitry changes said difficulty level of surrounding for only a fixed period of time, or by a fixed number of times, and
said game apparatus further comprises an erasing programmed logic circuitry that erases the obtained information as to said affecting object from said storing device when said fixed period of time elapses, or when said fixed number of times is exceeded.

28. A game system having a display that displays an object in a virtual space on a screen and a pointing device that designates at least a position on said screen, comprising:
an input coordinate detecting programmed logic circuitry that detects an input coordinate indicating the position on said screen designated by said pointing device every predetermined time period;
a line segment calculating programmed logic circuitry that calculates a line segment connecting a previous input coordinate and a current input coordinate which were detected by said input coordinate detecting programmed logic circuitry;
a closed region determining programmed logic circuitry that determines whether a closed region is formed by a plurality of line segments calculated by said line segment calculating programmed logic circuitry;
a surrounding determining programmed logic circuitry that determines whether said object is included in said closed region when it is determined that said closed region is formed by said closed region determining programmed logic circuitry;
an affecting object storage controlling programmed logic circuitry that stores obtained information taking said object as an affecting object in a storing device when it is determined that said object is included in said closed region by said surrounding determining programmed logic circuitry; and
a difficulty level changing programmed logic circuitry that changes a difficulty level of surrounding another object on the basis of the affecting object indicated by the obtained information stored in said storing device during operation of the game system.

29. The game system according to claim 28, wherein
said difficulty level changing programmed logic circuitry changes a moving speed of said object.

30. The game system according to claim 28, wherein
said difficulty level changing programmed logic circuitry changes a movable range of said object.

31. The game system according to claim 28, wherein
a length of a drawable line is constant, and
said difficulty level changing programmed logic circuitry changes said length of the drawable line.

32. The game system according to claim 28, wherein
said game program causes said processor to function as a line segment displaying programmed logic circuitry that displays the line segment calculated by said line segment calculating programmed logic circuitry in a color based on an attribute of the affecting object corresponding to the obtained information stored in said storing device.

33. A game system having a display that displays an object in a virtual space on a screen and a pointing device that designates at least a position on said screen, comprising:
an input coordinate detecting programmed logic circuitry that detects an input coordinate indicating the position on said screen designated by said pointing device every predetermined time period;
a line segment calculating programmed logic circuitry that calculates a line segment connecting a previous input coordinate and a current input coordinate which were detected by said input coordinate detecting programmed logic circuitry;
a closed region determining programmed logic circuitry that determines whether a closed region is formed by a plurality of line segments calculated by said line segment calculating programmed logic circuitry;
a surrounding determining programmed logic circuitry that determines whether said object is included in said closed region when it is determined that said closed region is formed by said closed region determining programmed logic circuitry;
an affecting object storage controlling programmed logic circuitry that stores obtained information taking said object as an affecting object in a storing device when it is determined that said object is included in said closed region by said surrounding determining programmed logic circuitry; and a difficulty level changing programmed logic circuitry that changes a difficulty level of surrounding another object on the basis of the affecting object indicated by the obtained information stored in said storing device;

a surrounding count counting programmed logic circuitry that counts the number of determinations that said object is included in said closed region by said surrounding determining programmed logic circuitry, and a surrounding count determining programmed logic circuitry that determines whether the number of times counted by said surrounding count counting programmed logic circuitry reaches a predetermined number of times, wherein said affecting object storage controlling programmed logic circuitry stores obtained information taking said object as an affecting object in said storing device when it is determined that the number of surroundings reaches said predetermined number of times by said surrounding count determining programmed logic circuitry.

34. The game system according to claim 33, further comprising a surrounding count resetting programmed logic circuitry that resets the number of surroundings counted by said surrounding count counting programmed logic circuitry when an input coordinate is not detected by said input coordinate detecting programmed logic circuitry, or when said object contacts said line segment.

35. The game system according to claim 33, wherein said difficulty level changing programmed logic circuitry changes a count value of said surrounding count counting programmed logic circuitry.

36. A game system having a display that displays an object in a virtual space on a screen and a pointing device that designates at least a position on said screen, comprising:

an input coordinate detecting programmed logic circuitry that detects an input coordinate indicating the position on said screen designated by said pointing device every predetermined time period;

a line segment calculating programmed logic circuitry that calculates a line segment connecting a previous input coordinate and a current input coordinate which were detected by said input coordinate detecting programmed logic circuitry;

a closed region determining programmed logic circuitry that determines whether a closed region is formed by a plurality of line segments calculated by said line segment calculating programmed logic circuitry;

a surrounding determining programmed logic circuitry that determines whether said object is included in said closed region when it is determined that said closed region is formed by said closed region determining programmed logic circuitry;

an affecting object storage controlling programmed logic circuitry that stores obtained information taking said object as an affecting object in a storing device when it is determined that said object is included in said closed region by said surrounding determining programmed logic circuitry; and a difficulty level changing programmed logic circuitry that changes a difficulty level of surrounding another object on the basis of the affecting object indicated by the obtained information stored in said storing device; wherein said difficulty level changing programmed logic circuitry changes said difficulty level of surrounding for only a fixed period of time, or by a fixed number of times, and said game system further comprises an erasing programmed logic circuitry that erases the obtained information as to said affecting object from said storing device when said fixed period of time elapses, or when said fixed number of times is exceeded.

* * * * *

UNITED STATES PATENT AND TRADEMARK OFFICE
CERTIFICATE OF CORRECTION

PATENT NO. : 7,927,215 B2  
APPLICATION NO. : 11/598768  
DATED : April 19, 2011  
INVENTOR(S) : Sekimori Page 1 of 1

It is certified that error appears in the above-identified patent and that said Letters Patent is hereby corrected as shown below:

Front Page of Patent:

Delete: "(73) Assignee: NINETENDO CO., LTD., KYOTO, (JP)"

Insert: --(73) Assignee: HAL LABORATORY INC., TOKYO (JP)

CREATURES, INC., TOKYO, (JP)

NINTENDO CO., LTD., KYOTO, (JP)--.

Signed and Sealed this
Twelfth Day of July, 2011

David J. Kappos
*Director of the United States Patent and Trademark Office*